US008789063B2

(12) United States Patent
Hodson et al.

(10) Patent No.: US 8,789,063 B2
(45) Date of Patent: Jul. 22, 2014

(54) MASTER AND SUBORDINATE OPERATING SYSTEM KERNELS FOR HETEROGENEOUS MULTIPROCESSOR SYSTEMS

(75) Inventors: Orion Hodson, Redmond, WA (US); Haryadi Gunawi, Madison, WI (US); Galen C. Hunt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 11/694,339

(22) Filed: Mar. 30, 2007

(65) Prior Publication Data

US 2008/0244599 A1    Oct. 2, 2008

(51) Int. Cl.
G06F 9/46        (2006.01)
G06F 9/45        (2006.01)

(52) U.S. Cl.
USPC ............ 718/104; 718/100; 718/102; 717/149

(58) Field of Classification Search
USPC ...................... 718/104, 1, 100, 101, 102, 107, 718/104.102; 717/149
See application file for complete search history.

(56) References Cited

U.S. PATENT DOCUMENTS

| | | |
|---|---|---|
| 4,885,684 A | 12/1989 | Austin et al. |
| 4,916,637 A | 4/1990 | Allen et al. |
| 5,031,089 A | 7/1991 | Liu et al. |
| 5,057,996 A | 10/1991 | Cutler et al. |
| 5,179,702 A | 1/1993 | Spix et al. |
| 5,317,568 A | 5/1994 | Bixby et al. |
| 5,329,619 A | 7/1994 | Page et al. |
| 5,339,443 A | 8/1994 | Lockwood |
| 5,349,682 A | 9/1994 | Rosenberry |
| 5,361,359 A | 11/1994 | Tajalli et al. |
| 5,367,681 A | 11/1994 | Foss et al. |

(Continued)

FOREIGN PATENT DOCUMENTS

| | | |
|---|---|---|
| CN | 1549108 A | 11/2004 |
| EP | 1033648 A2 | 9/2000 |

(Continued)

OTHER PUBLICATIONS

Berman, et al., "Application-Level Scheduling on Distributed Heterogeneous Networks (Technical Paper)", available at least as early as Mar. 6, 2007, at <<http://citeseer.ist.psu.edu/cache/papers/cs/30161/http:zSzzSzwww-cse.ucsd.eduzSz~gshaozSzpaperszSzsup96.pdf/application-level-scheduling-on.pdf>>, pp. 1-29.

(Continued)

*Primary Examiner* — Emerson Puente
*Assistant Examiner* — Willy W Huaracha
(74) *Attorney, Agent, or Firm* — Dan Choi; Carole Boelitz; Micky Minhas

(57) ABSTRACT

Systems and methods establish communication and control between various heterogeneous processors in a computing system so that an operating system can run an application across multiple heterogeneous processors. With a single set of development tools, software developers can create applications that will flexibly run on one CPU or on combinations of central, auxiliary, and peripheral processors. In a computing system, application-only processors can be assigned a lean subordinate kernel to manage local resources. An application binary interface (ABI) shim is loaded with application binary images to direct kernel ABI calls to a local subordinate kernel or to the main OS kernel depending on which kernel manifestation is controlling requested resources.

20 Claims, 15 Drawing Sheets

(56) References Cited

U.S. PATENT DOCUMENTS

| | | |
|---|---|---|
| 5,455,951 A | 10/1995 | Bolton et al. |
| 5,469,571 A | 11/1995 | Bunnell |
| 5,481,717 A | 1/1996 | Gaboury |
| 5,522,075 A | 5/1996 | Robinson et al. |
| 5,551,051 A | 8/1996 | Silverthorn et al. |
| 5,574,911 A | 11/1996 | D'Angelo et al. |
| 5,590,001 A | 12/1996 | Ino et al. |
| 5,590,281 A | 12/1996 | Stevens |
| 5,666,519 A | 9/1997 | Hayden |
| 5,694,601 A | 12/1997 | White |
| 5,737,605 A | 4/1998 | Cunningham et al. |
| 5,752,032 A | 5/1998 | Keller et al. |
| 5,754,845 A | 5/1998 | White |
| 5,768,532 A | 6/1998 | Megerian |
| 5,794,052 A | 8/1998 | Harding |
| 5,845,129 A | 12/1998 | Wendorf et al. |
| 5,857,195 A | 1/1999 | Hayashi et al. |
| 5,878,408 A | 3/1999 | Van Huben et al. |
| 5,923,878 A | 7/1999 | Marsland |
| 5,931,938 A | 8/1999 | Drogichen et al. |
| 5,938,723 A | 8/1999 | Hales, II et al. |
| 5,944,821 A | 8/1999 | Angelo |
| 5,958,050 A | 9/1999 | Griffin et al. |
| 5,963,743 A | 10/1999 | Amberg et al. |
| 5,974,572 A | 10/1999 | Weinberg et al. |
| 5,991,518 A | 11/1999 | Jardine et al. |
| 6,003,129 A | 12/1999 | Song et al. |
| 6,006,328 A | 12/1999 | Drake |
| 6,009,476 A | 12/1999 | Flory et al. |
| 6,038,399 A | 3/2000 | Fisher et al. |
| 6,066,182 A | 5/2000 | Wilde et al. |
| 6,072,953 A | 6/2000 | Cohen et al. |
| 6,078,744 A | 6/2000 | Wolczko et al. |
| 6,080,207 A | 6/2000 | Kroening et al. |
| 6,092,189 A | 7/2000 | Fisher et al. |
| 6,115,819 A | 9/2000 | Anderson |
| 6,144,992 A | 11/2000 | Turpin et al. |
| 6,157,928 A | 12/2000 | Sprenger et al. |
| 6,161,051 A | 12/2000 | Hafemann et al. |
| 6,182,275 B1 | 1/2001 | Beelitz et al. |
| 6,202,147 B1 | 3/2001 | Slaughter et al. |
| 6,247,128 B1 | 6/2001 | Fisher et al. |
| 6,279,111 B1 | 8/2001 | Jensenworth et al. |
| 6,292,941 B1 | 9/2001 | Jollands |
| 6,321,334 B1 | 11/2001 | Jerger et al. |
| 6,324,622 B1 | 11/2001 | Okpisz et al. |
| 6,341,371 B1 | 1/2002 | Tandri |
| 6,351,850 B1 | 2/2002 | van Gilluwe et al. |
| 6,381,742 B2 | 4/2002 | Forbes et al. |
| 6,405,361 B1 | 6/2002 | Broy et al. |
| 6,434,694 B1 | 8/2002 | Slaughter et al. |
| 6,438,549 B1 | 8/2002 | Aldred et al. |
| 6,442,754 B1 | 8/2002 | Curtis |
| 6,446,260 B1 | 9/2002 | Wilde et al. |
| 6,487,723 B1 | 11/2002 | MacInnis |
| 6,542,926 B2 | 4/2003 | Zalewski et al. |
| 6,546,546 B1 | 4/2003 | Van Doorn |
| 6,629,152 B2 | 9/2003 | Kingsbury et al. |
| 6,658,447 B2 | 12/2003 | Cota-Robles |
| 6,715,144 B2 | 3/2004 | Daynes et al. |
| 6,732,220 B2 | 5/2004 | Babaian et al. |
| 6,748,592 B1 | 6/2004 | Porter |
| 6,816,905 B1 | 11/2004 | Sheets et al. |
| 6,817,013 B2 | 11/2004 | Tabata et al. |
| 6,842,782 B1 | 1/2005 | Malik et al. |
| 6,868,539 B1 | 3/2005 | Travison et al. |
| 6,904,519 B2 | 6/2005 | Anand et al. |
| 6,912,692 B1 | 6/2005 | Pappas |
| 6,944,754 B2 | 9/2005 | Zilles et al. |
| 6,973,517 B1 | 12/2005 | Golden et al. |
| 6,977,994 B2 | 12/2005 | Stephenson et al. |
| 6,988,261 B2 | 1/2006 | Sokolov et al. |
| 7,000,092 B2 | 2/2006 | Gehman et al. |
| 7,036,114 B2 | 4/2006 | McWilliams et al. |
| 7,062,764 B2 | 6/2006 | Cohen et al. |
| 7,086,056 B2 | 8/2006 | Fukushima |
| 7,089,289 B1 | 8/2006 | Blackmore et al. |
| 7,155,713 B1 | 12/2006 | Burkhardt et al. |
| 7,167,867 B1 | 1/2007 | Rago |
| 7,200,840 B2 | 4/2007 | Gschwind et al. |
| 7,222,106 B2 | 5/2007 | Block et al. |
| 7,222,341 B2 | 5/2007 | Forbes et al. |
| 7,278,030 B1 | 10/2007 | Chen et al. |
| 7,451,435 B2 | 11/2008 | Hunt et al. |
| 7,454,477 B2 | 11/2008 | Talluri et al. |
| 7,484,245 B1 | 1/2009 | Friedman et al. |
| 7,600,232 B2 | 10/2009 | Hunt et al. |
| 7,694,300 B2 | 4/2010 | Hunt et al. |
| 7,788,637 B2 | 8/2010 | Hunt et al. |
| 7,882,317 B2 | 2/2011 | Hunt et al. |
| 2001/0029605 A1 | 10/2001 | Forbes et al. |
| 2002/0004852 A1 | 1/2002 | Sadovsky et al. |
| 2002/0099954 A1 | 7/2002 | Kedma et al. |
| 2002/0100017 A1 | 7/2002 | Grier et al. |
| 2002/0143842 A1 | 10/2002 | Cota-Robles et al. |
| 2003/0056084 A1 | 3/2003 | Holgate et al. |
| 2003/0061067 A1 | 3/2003 | Atwal et al. |
| 2003/0061401 A1 | 3/2003 | Luciani, Jr. |
| 2003/0061404 A1 | 3/2003 | Atwal et al. |
| 2003/0084256 A1 | 5/2003 | McKee |
| 2003/0097581 A1 | 5/2003 | Zimmer |
| 2003/0130854 A1 | 7/2003 | Galanes et al. |
| 2003/0188231 A1 | 10/2003 | Cronce |
| 2003/0191867 A1 | 10/2003 | Czajkowski |
| 2003/0200402 A1 | 10/2003 | Willman et al. |
| 2003/0212990 A1 | 11/2003 | Brodkorb et al. |
| 2003/0221012 A1 | 11/2003 | Herrmann et al. |
| 2003/0233644 A1 | 12/2003 | Cohen et al. |
| 2004/0003324 A1 | 1/2004 | Uhlig et al. |
| 2004/0015911 A1 | 1/2004 | Hinsley et al. |
| 2004/0025016 A1 | 2/2004 | Focke et al. |
| 2004/0034850 A1 | 2/2004 | Burkhardt et al. |
| 2004/0061067 A1 | 4/2004 | Clauss |
| 2004/0064736 A1 | 4/2004 | Obrecht et al. |
| 2004/0078799 A1 | 4/2004 | Koning et al. |
| 2004/0123273 A1 | 6/2004 | Hammerich et al. |
| 2004/0153991 A1 | 8/2004 | Chen et al. |
| 2004/0187096 A1 | 9/2004 | Dumont |
| 2004/0193819 A1 | 9/2004 | Marinescu et al. |
| 2004/0199763 A1 | 10/2004 | Freund |
| 2004/0226023 A1 | 11/2004 | Tucker |
| 2004/0236861 A1 | 11/2004 | Bondar et al. |
| 2004/0268171 A1 | 12/2004 | Inoue et al. |
| 2005/0005261 A1 | 1/2005 | Severin |
| 2005/0021537 A1 | 1/2005 | Brendle et al. |
| 2005/0050069 A1 | 3/2005 | Vaschillo et al. |
| 2005/0060687 A1 | 3/2005 | Ghazaleh et al. |
| 2005/0071592 A1 | 3/2005 | DeCaro |
| 2005/0071828 A1 | 3/2005 | Brokenshire et al. |
| 2005/0081181 A1 | 4/2005 | Brokenshire et al. |
| 2005/0081203 A1* | 4/2005 | Aguilar et al. ............... 718/100 |
| 2005/0091658 A1 | 4/2005 | Kavalam et al. |
| 2005/0119902 A1 | 6/2005 | Christiansen |
| 2005/0125789 A1 | 6/2005 | Dijkstra et al. |
| 2005/0188364 A1 | 8/2005 | Cockx et al. |
| 2005/0188372 A1* | 8/2005 | Inoue et al. ............... 718/100 |
| 2005/0188373 A1 | 8/2005 | Inoue et al. |
| 2005/0203988 A1 | 9/2005 | Nollet et al. |
| 2005/0223239 A1 | 10/2005 | Dotan |
| 2005/0246718 A1 | 11/2005 | Erlingsson et al. |
| 2006/0005082 A1 | 1/2006 | Fossum et al. |
| 2006/0026578 A1 | 2/2006 | Ramchandran et al. |
| 2006/0031815 A1 | 2/2006 | Bhagia et al. |
| 2006/0047875 A1* | 3/2006 | Aguilar et al. ............... 710/260 |
| 2006/0069692 A1 | 3/2006 | Pernia |
| 2006/0085789 A1 | 4/2006 | Laborczfalvi et al. |
| 2006/0123401 A1 | 6/2006 | O'Brien et al. |
| 2006/0123417 A1 | 6/2006 | Hunt et al. |
| 2007/0011199 A1 | 1/2007 | Hunt et al. |
| 2007/0033592 A1* | 2/2007 | Roediger et al. ............... 718/102 |
| 2007/0043936 A1 | 2/2007 | Day et al. |
| 2007/0061483 A1 | 3/2007 | Dauger |
| 2007/0094495 A1 | 4/2007 | Hunt et al. |
| 2007/0094673 A1 | 4/2007 | Hunt et al. |

(56) References Cited

U.S. PATENT DOCUMENTS

| | | | |
|---|---|---|---|
| 2007/0113229 A1* | 5/2007 | Serghi et al. | 718/100 |
| 2007/0192762 A1 | 8/2007 | Eichenberger et al. | |
| 2007/0256080 A1 | 11/2007 | Smith et al. | |
| 2007/0283337 A1 | 12/2007 | Kasahara et al. | |
| 2007/0288940 A1* | 12/2007 | Keljo | 719/328 |
| 2008/0005750 A1 | 1/2008 | Hunt et al. | |
| 2008/0022278 A1* | 1/2008 | Gschwind et al. | 718/100 |
| 2008/0034357 A1 | 2/2008 | Gschwind | |
| 2008/0244507 A1 | 10/2008 | Hodson et al. | |
| 2008/0244682 A1* | 10/2008 | Sparrell et al. | 725/134 |
| 2008/0250414 A1* | 10/2008 | Brokenshire et al. | 718/102 |
| 2010/0162220 A1 | 6/2010 | Cui et al. | |
| 2010/0199357 A1* | 8/2010 | Hoffman et al. | 726/27 |
| 2012/0227057 A1* | 9/2012 | Lupu et al. | 719/318 |
| 2012/0297163 A1* | 11/2012 | Breternitz et al. | 712/22 |

FOREIGN PATENT DOCUMENTS

| | | |
|---|---|---|
| EP | 1443398 A2 | 8/2004 |
| JP | 01292537 | 11/1989 |
| JP | 05119987 | 5/1993 |
| JP | 05181919 | 7/1993 |
| JP | 052224956 | 9/1993 |
| JP | 2002506247 | 2/2002 |
| JP | 2003233521 | 8/2003 |
| JP | 2004513412 | 4/2004 |
| JP | 2004139396 | 5/2004 |
| JP | 2004530191 A | 9/2004 |
| JP | 2005129066 | 5/2005 |
| KR | 10-1992-0013166 A | 7/1992 |
| KR | 20010007119 A | 1/2001 |
| KR | 20010109271 | 12/2001 |
| RU | 2155373 C2 | 8/2000 |
| RU | 2307388 C2 | 9/2007 |
| RU | 2337398 C2 | 10/2008 |
| WO | WO02093370 A | 11/2002 |
| WO | WO03038599 A2 | 5/2003 |
| WO | WO03088086 A1 | 10/2003 |
| WO | WO2004025491 A1 | 3/2004 |
| WO | WO2004099949 A1 | 11/2004 |
| WO | WO2005036835 A1 | 4/2005 |

OTHER PUBLICATIONS

Khokhar, et al., "Heterogeneous Computing: Challenges and Opportunities", available at least as early as Mar. 6, 2007, at <<http://meseec.ce.rit.edu/eecc722-fall2002/papers/hc/1/r6018.pdf>>, IEEE, 1993, pp. 18-27.

Lyonnard, et al., "Automatic Generation of Application-Specific Architectures for Heterogeneous Multiprocessor System-on-Chip", available at least as early as Mar. 6, 2007, at <<http://delivery.acm.org/10.1145/380000/379015/p518-lyonnard.pdf?key1=379015&key2=7123613711&coll=GUIDE&dl=GUIDE&CFID=16158147&CFTOKEN=58686892>>, ACM, 2001, pp. 518-523.

Sun, et al., "Synthesis of Application-Specific Heterogeneous Multiprocessor Architectures using Extensible Processors", available at least as early as Mar. 6, 2007, at <<http://ieeexplore.ieee.org/iel5/9501/30140/01383333.pdf?isNumber=>>, IEEE, 2005, pp. 1-6.

PCT Search Report for PCT Application No. PCT/US2008/058807, mailed Sep. 30, 2008 (10 pages).

U.S. Appl. No. 60/692,190 entitled "Secure and Stable Hosting of Third-Party Extension to Web Services," Hunt et al, filed Jun. 20, 2005.

U.S. Appl. No. 60/730,546 entitled "Programming Language Support for Software Isolation Processes (SIPs) and Isolated Extensions and Device Drivers Based Upon SIPs," Hunt et al, filed Oct. 26, 2005.

Acceta et al.; "Mach: A New Kernel Foundation for UNIX Development", In Summer USENIX Conference, Atlanta, GA, Jun. 1986, pp. 93-112.

Acharya, et al., "MAPbox: Using Parameterized Behavior Classes to Confine Applications", University of California, Santa Barbara, May 1, 1999, pp. 1-19.

Back et al., "Processes in KaffeOS: Isolation, Resource Management, and Sharing in Java", Proceedings of the 4th USENIX Symposium, Dec. 6, 2004, pp. 333-346.

Bogojevic, et al., "The Architecture of Massive Multiplayer Online Games", retrieved on Feb. 25, 2009 at <<http://graphics.cs.lth.se/theses/projects/mmogarch/som.pdf>>, Department of Computer Science, Lund University, Chapter 4, Sep. 8, 2003, 11 pages.

Chaki et al, "Types as Models: Model Checking Message-Passing Programs", Proceedings of the 29th ACM Symposium on Principles of Programming Lanuages, Jan. 16-18, 2002, pp. 45-57.

Chiueh, et al., "Integrating segmentation and paging protection for safe, efficient and transparent software extensions", SOSP-17, ACM, Dec. 1999, pp. 140-153.

Dorward et al; "The Inferno Operating System"; Bell Labs Technical Journal, 2 (1), Winter 1997, pp. 5-18.

Engler et al.; "Exokernel: an Operating System Architecture for Application-Level Resource Management"; In Proceedings of the Fifteenth ACM Symposium on Operating System Principles, Cooper Mountain Resort, CO, Dec. 1995, pp. 251-266.

Fraim, "Scomp: A Solution to the Multilevel Security Problem", Computer, vol. 16, Issue 7, Jul. 1983, pp. 26-34.

Gay et al., "Session Types for Inter-Process Communication", University of Glasgow, Department of Computing Science Technical Report (TR-2003-133), Mar. 2003, 33 pages.

Goldberg et al.; "Smalltalk-80: The Language and Its Implementation"; Addison-Wesley, May 1983, pp. 292-297.

Golm et al.; "The JX Operating System"; In Proceedings of the USENIX 2002 Annual Conference, Monterey, CA, Jun. 2002, pp. 45-58.

Golm et al., "Beyond Address Spaces- Flexibility, Preformance, Protection, and Resource Management in the Type-Safe JX Operating System", Proc. of the 8th Workshop on Hot Topics in Operating Systems, May 2001, pp. 1-6.

Hartig et al.; "The Perfromance of u-Kernel-Based Systems"; In Proceedings of the Sixteenth ACM Symposium on Operating Systems Principles (SOSP '97), Saint Malo, France, Oct. 1997, pp. 66-77.

Hawblitzel et al.; "Implementing Multiple Protection Domains in Java"; In Proceedings of the 1998 USENIX Annual Technical Conference, New Orleans, LA, Dec. 1998, pp. 259-270.

Hawblitzel et al.; "Luna: A Flexible Java Protection System"; In Proceedings of the Fifth ACM Symposium on Operating System Design and Implementation (OSDI'02), Boston, MA, Dec. 9-11, 2002, pp. 391-403.

Huang et al., "Securing Web Application Code by Static Analysis and Runtime Protection", Proceedings of the 13th International Conference on World Wide Web, ACM, New York, NY, May 17-22, 2004, pp. 40-51.

Hunt et al, "Broad New OS Research: Challenges and Opportunities" Retrieved from <<http://research.microsoft.com/os/singularity/publications/hotos2005_broadnewreseach.pdf>> on Dec. 2, 2008, Jun. 2005, 6 pgs.

Hunt et al., "Singularity Technical Report 1: Singularity Design Motivation", Microsoft Research, MSR-TR-2004-105, Dec. 17, 2004, pp. 1-4.

"JSR-000121 Application Isolation API Specification"; available at <<http://jcp.org/aboutJava/communityprocess/pfd/jsr121/index.html<< on Sep. 7, 2006, 1 page.

"JSR 121: Application Isolation API Specification" Java Specification Requests, retrieved at <<http://jcp.org/en/jsr/detail?id=121>> on Sep. 7, 2006, 7 pages.

Kurchuk, et al., "Recursive Sandboxes: Extending Systrace to Empower Applications", retrieved on Sep. 4, 2009 at <<http://web.archive.org/web/20040725140723/http://nsl.cs.columbia.edu/projects/gridlock/systrace_extensions.pdf>>, 2004, pp. 1-16.

McNamee et al., "An Attribute Grammar Approach to Compiler Optimization of Intra-Module Interprocess Communication", International Journal of Parallel Programming, vol. 20, No. 3, Mar. 1991, pp. 181-202.

"Microsoft Computer Dictionary", S-100 bus to Scalable Processor Architecture including sandbox, retrieved on Sep. 4, 2009 at <<http://proquest.safaribooksonline.com/print?xmlid=0735614954/ch20>>, Fifth Edition, 2 pgs.

(56) References Cited

OTHER PUBLICATIONS

Microsoft Press Computer Dictionary, Second Edition, 1994, Published by Penguin Books, Ltd., pp. 23-24 and 279.
Microsoft Press Computer Dictionary Third Edition: 1997, p. 51.
Mikunov A., "Rewrite MSil Code on the Fly with the .NET Framework Profiling API", MSDN Magazine (Online), Sep. 2003, Retrieved from <<http://msdn.microsoft.com/en-us/magazine/cc188743(printer).aspx>> on Dec. 12, 2008, 16 pgs.
Perrine, et al., "An Overview of the Kernelized Secure Operating System (KSOS)", Proceedings of the 7th DoD/NBS Computer Security Conference, Sep. 24-26, 1984, pp. 0-14.
Perrine, "The Kernelized Secure Operating System (KSOS)", ;login: The Magazine of USENIX & SAGE, vol. 27, No. 6, Dec. 2002, pp. 37-40.
Pike, et al., "Plan 9 from Bell Labs," Computing Systems, vol. 8, No. 3, Summer 1995, pp. 221-254.
Pike, et al, "The Use of Name Spaces in Plan 9", Operating Systems Review, vol. 27, No. 2, Apr. 1993, pp. 72-76.
Provos, "Improving Host Security with System Call Policies", Proceedings of the 12th USENIX Security Symposium, USENIX Association, Aug. 2003, pp. 257-271.
Rajamani et al.; "Conformance Checking for Models of Asynchronous Message Passing Software"; In Proceedings of the International Conference on Computer Aided Verification (CAV 02), Springer, Copenhagen, Denmark, Jul. 2002, pp. 166-179.
Redell et al.; "Pilot: An Operating System for a Personal Computer"; Communications of the ACM, vol. 23, No. 2, Feb. 1980, pp. 81-92.
Rosenblum et al.; "The Impact of Architectural Trends on Operating System Performance"; In Proceedings of the Fifteenth ACM Symposium on Operating System Principles, Copper Mountain Resort, CO, Dec. 1995, pp. 285-298.
Skousen, et al., "Resource Access and Protection in the Sombrero Protection Model, Software Protection Data Structures and Hardware Range Protection Lookaside Buffer", ASU 64-bit OS Group White Paper 2, Technical Report, TR-95-013, Jan. 1996, 35 pages.
Swift et al; "Improving the Reliability of Commodity Operating Systems"; In Proceedings of the 19th ACM Symposium on Operating Systems Principles (SOSP '03), Bolton Landing, NY, Oct. 19-22, 2003, pp. 207-222.
Swinehart et al.; "A Structural View of the Cedar Programming Environment"; ACM Transactions on Programming Languages and Systems, 8 (4), Oct. 1986, pp. 419-490.
Tanenbaum, "Modern Operating Systems", Prentice Hall Inc., 2001, pp. 168-175.
Tatsubori et al: "Open Java: A Class-Based Macro System for Java" Retrieved from <<http://www.springerlink.com/content/n64gdultayqfmcjc/fulltext.pdf>>on Dec. 2, 2008, Jun. 2000, pp. 117-133.
Tost, "Loosely typed versus strongly typed Web services", IBM, Sep. 2, 2005, 14 pgs.
"Trademark Electronic Search System (TESS) from the USPTO database" for "WINDOWS" trademark of Microsoft filed in USPTO Aug. 20, 1999; retreived at <<http://tess2.uspto.gov/bin/gate.exe?f=doc&state=n00gan.5.26>> and <<http://tess2.uspto.gov/bin/gate.exe>> on Jan. 26, 2004 4 pgs.
"Variable Scope", retrieved on Aug. 20, 2009 at <<http://irc.essex.ac.uk/www.iota-six.co.uk/d/d5_variable_scope.asp>>, Scope, 2003, 5 pgs.
Wahbe et al.; "Efficient Software-Based Fault Isolation"; In Proceedings of the Fourteenth ACM Symposium on Operating System Principles, Asheville, NC, Dec. 5-8, 1993, pp. 203-216.
Watson, et al., "Design and implementation of the Trusted BSD MAC framework", Proceedings of 2003 DARPA Information Survivability Conference and Exposition, Sec. 1&5-7, Apr. 2003, pp. 1-12.
Weinreb et al.; "Lisp Machine Manual"; Symbolics, Inc., Cambridge, MA, Jul. 1981. p. 10.
Wood et al.; "An In-Cache Address Translation Mechanism"; In Proceedings of the Thirteenth Annual International Symposium on Computer Architecture, Jun. 1986, pp. 358-365.

Translated Japanese Office Action mailed May 24, 2011 for Japanese Patent Application No. 2005-354079, a counterpart foreign application of US Patent No. 7,451,435.
The Russian Office Action mailed Apr. 18, 2011 for Russian Patent Application No. 2008116714, a counterpart foreign application of U.S. Appl. No. 11/428,096.
The Mexican Office Action mailed Aug. 15, 2011 for Mexican Patent Application No. MX/a/2008/005402, a counterpart foreign application of U.S. Appl. No. 11/428,162, 6 pages
Translated Japanese Office Action mailed Dec. 2, 2011 for Japanese Patent Application No. 2008-537768, a counterpart foreign application of U.S. Appl. No. 11/428,162, 10 pages.
Translated Chinese Office Action mailed May 19, 2011 for Chinese Patent Application No. 200680040116.1, a counterpart foreign application of U.S. Appl. No. 11/428,096.
Translated Chinese Office Action mailed Jul. 1, 2011 for Chinese Patent Application No. 200680021042.7, a counterpart foreign application of U.S. Appl. No. 11/275,160.
Translated Japanese Notice of Rejection mailed Sep. 9, 2011 for Japanese Patent Application No. 2008-518169, a counterpart foreign application of U.S. Appl. No. 11/275,160, 16 pages.
Translated Mexican Office Action mailed Apr. 26, 2011 for Mexican Patent Application No. MX/a/2008/005403, a counterpart foreign application of U.S. Appl. No. 11/428,096.
Office Action for U.S. Appl. No. 11/694,455, mailed on Aug. 17, 2011, Orion Hodson, "Homogeneous Programming for Heterogeneous Multiprocessor Systems",12 pgs.
Translated Japanese Office Action mailed Jan. 22, 2013 for Japanese patent application No. 2005-352581, a counterpart foreign application of US patent No. 8,020,141, 8 pages.
Abbaspour et al., "Retargetable Binary Utilites", DAC 2002, Jun. 10-14, 2002, New Orleans, 6 pages.
The Chinese Office Action mailed Sep. 5, 2012 for Chinese patent application No. 200680040116.1, a counterpart foreign application of US patent No. 8,074,231, 6 pages.
Translated Japanese Office Action mailed Aug. 3, 2012 for Japanese patent application No. 2005-352581, a counterpart foreign application of US patent No. 8,020,141, 5 pages.
"Kernal Module Packages Manualfor CODE 9", Novel/SUSE, Jan. 27, 2006, http://www.suse.de/~agruen/KMPM/old/KernelModulePackagesManual-CODE9.pdf, 15 pages.
Translated Korean Office Action mailed Oct. 10, 2012 for Korean patent application No. 10-2007-7029343, a counterpart foreign application of U.S. Appl. No. 11/275,160, 5 pages.
Sbaraglia et al., "A Productivity Centered Application Performance Tuning Framework", Valuetools '07, Oct. 23-25, 2007, Nantes, France, 10 pages.
Chinese Office Action mailed Mar. 1, 2012 for Chinese patent application No. 200680021042.7, a counterpart foreign application of U.S. Appl. No. 11/275,160, 7 pages.
Chinese Office Action mailed Mar. 23, 2012 for Chinese patent application No. 200680040116.1, a counterpart foreign application of US patent No. 8,074,231, 6 pages.
European Office Action mailed Feb. 17, 2012 for European patent application No. 05111731.5, a counterpart foreign application of US patent application No. 8,020,141, 8 pages.
Extended European Search Report mailed Feb. 20, 2012 for European patent application No. 11009735.9, 8 pages.
Extended European Search Report mailed Feb. 23, 2012 for European patent application No. 11009734.2, 7 pages.
Hawblitzel, et al., "A Case for Language-Based Protection", Internet citation, Mar. 1998, pp. 1-12, retrieved from the internet at http://chrishawblitzel.net/publish/tr98_1670.ps on Feb. 9, 2012.
Japanese Office Action mailed Mar. 13, 2012 for Japanese patent application No. 2008-518169, a counterpart foreign application of U.S. Appl. No. 11/275,160, 4 pages.
Japanese Office Action mailed Mar. 30, 2012 for Japanese patent application No. 2008-537768, a counterpart foreign application for U.S. Appl. No. 11/428,162, 5 pages.
Translated Japanese Office Action mailed Jan. 27, 2012 for Japanese patent application No. 2008-537770, a counterpart foreign application of US patent No. 8,074,231, 6 pages.

(56) References Cited

OTHER PUBLICATIONS

Translated Japanese Office Action mailed Dec. 16, 2011 for Japanese patent application No. 2005-352581, a counterpart foreign application of US patent No. 8,020,141, 6 pages.
Chinese Office Action mailed Jun. 4, 2012 for Chinese patent application No. 200680021042.7, a counterpart foreign application of U.S. Appl. No. 11/275,160, 6 pages.
Translated Japanese Office Aciton mailed Apr. 17, 2012 for Japanese patent application No. 2005-352581, a counterpart foreign application of US patent No. 8,020,141, 4 pages.
Mexican Office Action mailed Dec. 15, 2011 for Mexican patent application No. MX/a/2008/005403, a counterpart foreign application of US patent No. 8,074,231, 5 pages.
Mexican Office Action mailed Feb. 9, 2012 for Mexican patent application No. MX/a/2008/005402, a counterpart foreign application of U.S. Appl. No. 11/428,162, 9 pages.
European Office Action mailed Mar. 14, 2013 for European patent application No. 11009734.2, a counterpart foreign application of US patent No. 8,020,141, 6 pages.
European Office Action mailed Mar. 14, 2013 for European patent application No. 11009735.9, a counterpart foreign application of US patent No. 8,020,141, 8 pages.
European Office Action mailed Mar. 27, 2013 for European patent application No. 05111731.5, a counterpart foreign application of US patent application No. 8,020,141, 8 pages.
Korean Office Action mailed Apr. 9, 2013 for Korean patent application No. 10-2007-7029343, a counterpart foreign application of U.S. Appl. No. 11/275,160, 9 pages.
Korean Office Action mailed May 13, 2013 for Korean patent application No. 10-2008-7010060, a counterpart foreign application of US patent No. 8,074,231, 5 pages.
Seo, et al., "Performance Evaluation of Dynamic Seamless Zone Server Model for Massively Multiplayer Online Game", Model for Massively Multiplayer Online Game, Division of Media, Ajou University, 2004, pp. 333-338.

Aiken et al., "Deconstructing Process Isolation", In Proceedings of the 2006 Workshop on Memory System Performance and Correctness (MSPC'06), Oct. 2006, 10 pages.
Fahndrich et al., "Language Support for Fast and Reliable Message-based Communication in Singularity OS", EuroSys'06, Apr. 2006, pp. 177-190.
Grosso, "Java RMI", O'Reilly Media, Jan. 2002, 33 pages.
Office action for U.S. Appl. No. 11/428,162, mailed on Jun. 27, 2013, Hunt et al., "Statically Verifiable Inter-Process-Communicative Isolated Processes ", 24 pages.
Wikipedia, "Strong and weak typing", retrieved from <<http:en.wikipedia.org/w/index.php?title=Strong_and_weak_typing&oldid=560035416>>, Jun. 2013, 1 page.
Hunt, et al., "An Overview of the Singularity Project", retrieved from <<http://research.microsoft.com/pubs/52716/tr-2005-135.pdf>>, Oct. 2005, 44 pages.
Translated copy of the Japanese Office Action mailed Aug. 20, 2013 for Japanese patent application No. 2005-352581, a counterpart foreign application of US patent application No. 8,020,141, 8 pages.
Office action for U.S. Appl. No. 11/275,160, mailed on Dec. 19, 2013, Hunt, et al., "Secure and Stable Hosting of Third-Party Extensions to Web Services", 14 pages
Extended European Search Report mailed Aug. 27, 2013 for European patent application No. 08733009.8, 12 pages.
Goble, et al., "A Dual Processor VAX 11/780", ACM Sigarch Computer Architecture News, vol. 10, No. 3, Apr. 1982, pp. 291-298.
Hunt, et al., "Broad News OS Research: Challenges and Opportunities", retrieved at <<http://research.microsoft.com/os/singularity/publications/hotos2005_broadnewresearch.pdf>>, Jun. 2005, 6 pages.
Kagstrom, et al., "The application kernel approach—a novel approach for adding SMP support to uniprocessor operating systems", Software Practice & Experience, Wiley & Sons, Bognor Regis, GB, vol. 36, No. 14, Nov. 25, 2006, pp. 1563-1583.
Muir, et al., "AsyMOS—An Asymmetric Multiprocessor Operating System", Open Architectures and Network Programming, 1998 IEEE San Francisco, CA, USA, Apr. 2-4, 1998, pp. 25-34.

\* cited by examiner

REMOTE METHOD INVOCATION

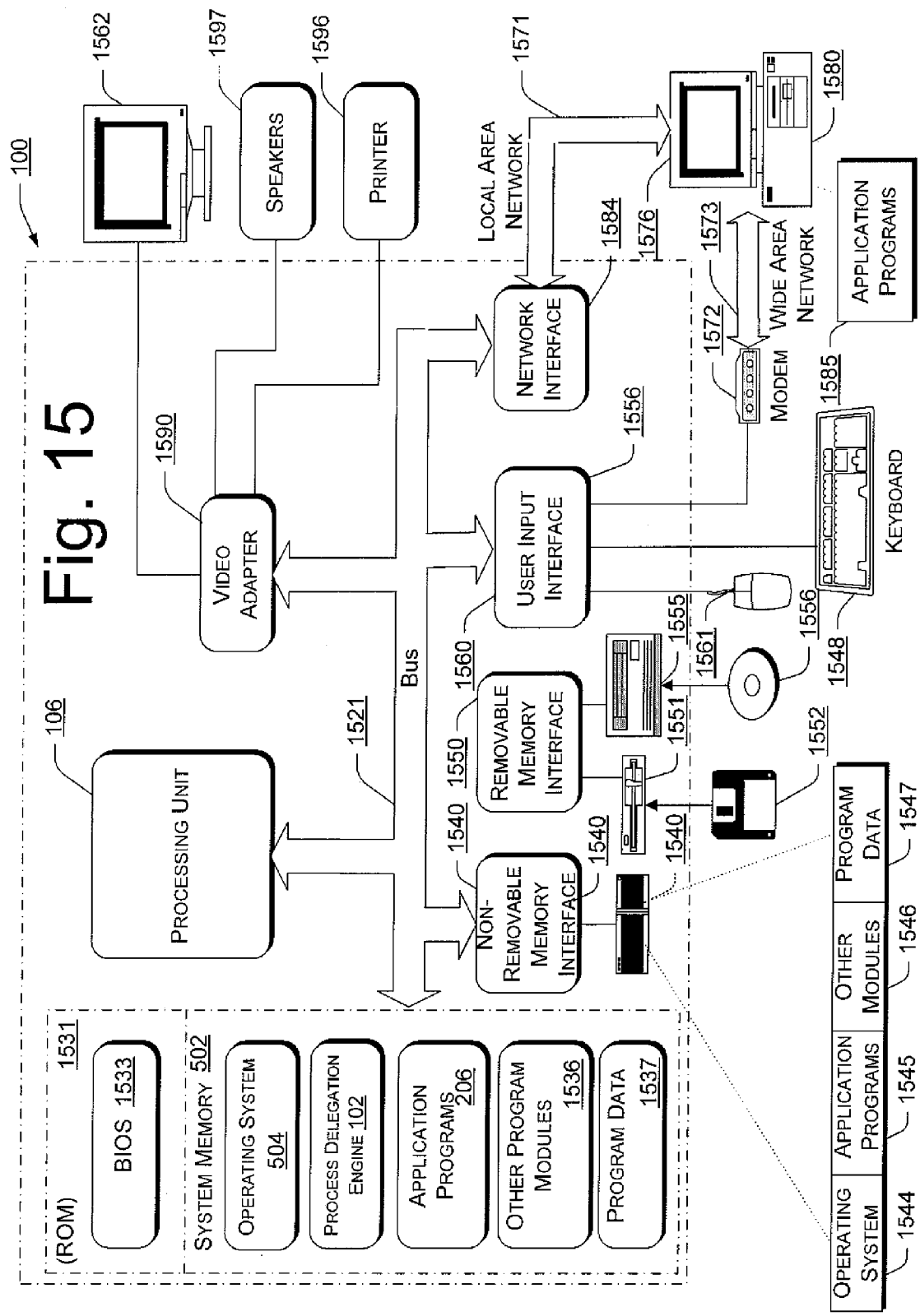

MASTER AND SUBORDINATE OPERATING SYSTEM KERNELS FOR HETEROGENEOUS MULTIPROCESSOR SYSTEMS

RELATED APPLICATIONS

This patent application is related to U.S. patent application Ser. No. 11/005,562 to Hunt et al., entitled, "Operating System Process Construction," filed Dec. 6, 2004, now U.S. Pat. No. 8,020,141. and also related to U.S. patent application Ser. No. 11/007,655 to Hunt et al., entitled, "Inter-Process Communications Employing Bi-directional Message Conduits," filed Dec. 7, 2004, now U.S. Pat. No. 7,600,232; both of these related applications are incorporated herein by reference. This application is also related to U.S. patent application Ser. No. 11/694,455, entitled, "Homogeneous Programming for Heterogeneous Multiprocessor Systems," filed Mar. 30, 2007, and incorporated herein by reference.

BACKGROUND

A computing system that has multiple processors, each perhaps with different memories and input/output (I/O) bus locality, may be described as heterogeneous. Besides the main central processing unit (CPU), auxiliary processors may be present, such as general purpose CPUs or GPUs, and peripheral processors. Examples of auxiliary processors residing on peripherals include programmable GPUs and those on network controllers. Auxiliary processors may also include general purpose CPUs dedicated to running applications and not running operating system (OS) code. Or, they may include processors to be used in low power scenarios, such as those in certain media capable mobile computers. Conventional peripheral processors typically run domain-constrained applications, but have processing power that might be employed for other tasks.

Other domains to which peripheral processors are targeted include video, network control, storage control, I/O, etc. In a heterogeneous system, the multiple processors may have very different characteristics. Typically, the processors have different instruction set architectures. Peripheral processors that enable ancillary computing functions are often located on physically separate boards in the computing system or are located on the same mainboard as the main CPU, but relatively remote in a logical sense-since they exist in ancillary subsystems. Because peripheral processors often support different instruction set architectures than the general purpose CPUs in the system, they interact with the operating system in a limited manner, through a narrowly defined interface.

The various different auxiliary and peripheral processors (each referred to hereinafter as "auxiliary") usually constitute resources in a computing system that lie idle at least part of the time, even when the main CPU is intensively processing under heavy load-this is because conventional operating systems do not have enough direct access to the auxiliary processors to delegate application processing tasks that are usually carried out only by the main CPU. Each auxiliary processor, in turn, usually has access to additional local resources, such as peripheral memory, etc. These additional resources also lie idle most of the time with respect to the processing load of the main CPU, because they are not so accessible that the operating system can delegate processing tasks of the main CPU to them in a direct and practical manner.

SUMMARY

Systems and methods establish communication and control between various heterogeneous processors in a computing system so that an operating system can run an application across multiple heterogeneous processors. With a single set of development tools, software developers can create applications that will flexibly run on one CPU or on combinations of central, auxiliary, and peripheral processors. In a computing system, application-only processors can be assigned a lean subordinate kernel to manage local resources. An application binary interface (ABI) shim is loaded onto application-only processors with application binary images to direct kernel ABI calls to a local subordinate kernel or to the main OS kernel depending on which kernel manifestation is controlling requested resources.

This summary is provided to introduce the subject matter of process and operating system interactions in heterogeneous multiprocessor systems, which is further described below in the Detailed Description. This summary is not intended to identify essential features of the claimed subject matter, nor is it intended for use in determining the scope of the claimed subject matter.

BRIEF DESCRIPTION OF THE DRAWINGS

FIG. 15 is a block diagram of an exemplary computing system.

DETAILED DESCRIPTION

Overview

This disclosure describes master and subordinate operating system kernels for heterogeneous multiprocessor systems, including interactions between the operation system (OS) and application processes in computing systems that have a heterogeneous mix of processors—that is, most computing systems.

Figure 1:
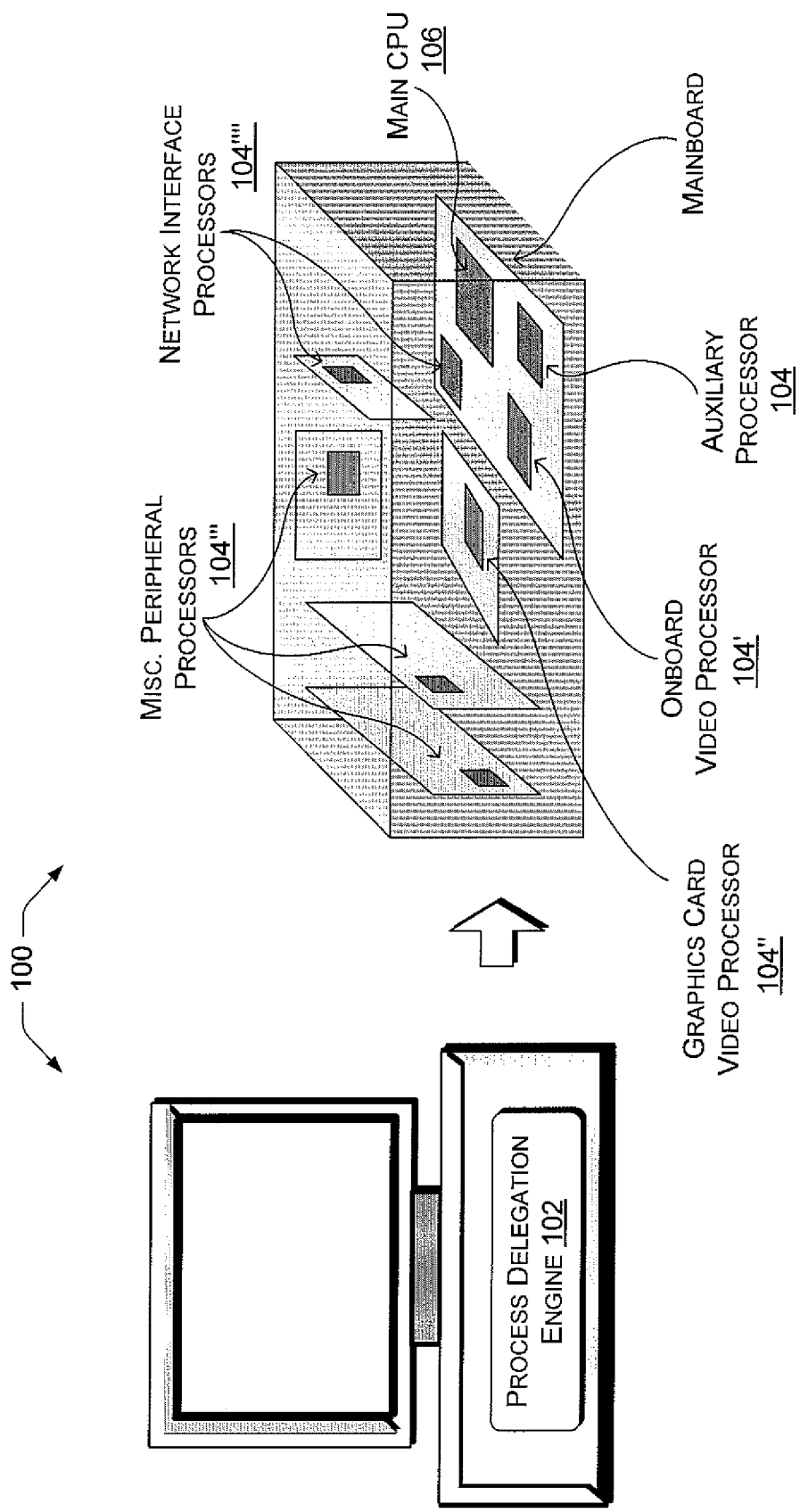
FIG. 1 is a diagram of an exemplary computing system with multiple heterogeneous processors and an exemplary process delegation engine.

FIG. 1 shows an exemplary computing system 100 that includes an exemplary process delegation engine 102. A detailed description of such an example computing system 100 is also given for reference in FIG. 15, and its accompanying description. In the example systems and methods to be described below, including the exemplary process delegation engine 102 just introduced, the different processors 104 found within the wingspan of a typical computing system 100, such as a desktop or mobile computer, are communicatively coupled and utilized to run various processes of software applications that are conventionally limited to running only on a central or main CPU 106. Communication between the heterogeneous processors 104 can be realized in different ways, such as sending and receiving messages via memory regions that are shared between processors, where messages can be written and an interrupt assertion mechanism allows the sender to alert the recipient of the presence of a message in memory. Another mechanism is a message transport, such as a message bus in which messages can be exchanged but processors do not necessarily share access to common memory regions.

This exemplary delegation of CPU tasks to auxiliary and peripheral processors 104 provides many benefits. From the standpoint of the software developer, an application-in-development written to an exemplary programming model with a single set of development tools allows the finished application to run flexibly either on the main CPU 106 only, on auxiliary processors 104 only, or a combination of the main CPU 106 and some or all of the auxiliary processors 104.

From the standpoint of the computing system 100, exemplary techniques empower the OS to offload application processes from the main CPU 106 to auxiliary processors 104 that have current capacity to handle more processing load. Thus, an exemplary system 100 turbo-charges both the software application and the computing system hardware. The application runs faster and/or more efficiently. In the context of a laptop, notebook, or other mobile computing device, the exemplary system may conserve energy, and can also be used to decrease excess heat production at the main CPU.

A compelling example to which the exemplary techniques to be described below may be applied, is a computing system that includes a redundant array of storage disks (RAID) storage controller. RAID storage cards typically have an on-board CPU and memory subsystem that is used in supervising the replication and reconstruction of data in the attached RAID array. The CPU is typically a customized low power general purpose CPU, such as a low power general purpose CPU or a micro controller, possibly with some additional instructions targeted at optimizing common RAID controller operations. A RAID storage controller has locality to the data it is responsible for, and can potentially run applications that leverage the data locality. For example, in the context of an exemplary computing system, the RAID storage controller can run search services for the data managed by the controller. A search application running on the controller has the advantage of data locality and fewer concurrent tasks to run than if running solely on the main CPU. Similarly, the RAID controller can run the file system drivers for the file systems stored in the drives attached to the RAID controller, and remove that responsibility from the operating system—this can enable fewer context switches in the general purpose CPUs, leaving them freer for making better progress on computation tasks.

Exemplary Software Development System

Figure 2:
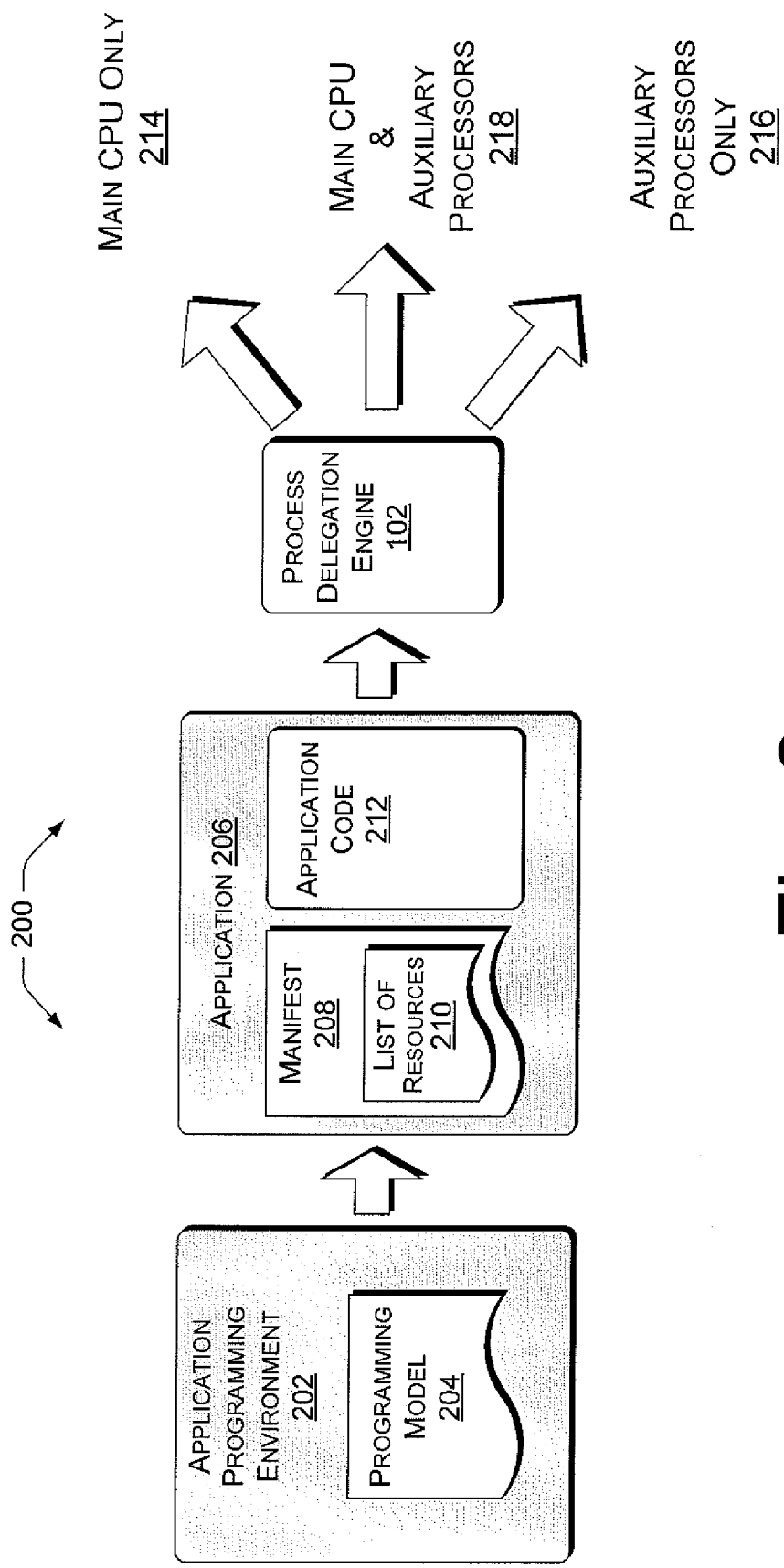
FIG. 2 is a diagram of an exemplary application programming environment.

FIG. 2 shows exemplary software application development 200. In one example scenario, an application programming environment 202 adheres to an exemplary programming model 204 that embodies exemplary techniques and mechanisms for coding an application 206 to run on one or many processors. The term "coding" as used herein refers to assembling, converting, transforming, interpreting, compiling, etc., programming abstractions into processor-usable ("native") instructions or language. In one implementation, the application programming environment 202 produces an application 206 that includes a manifest 208 having a list of resources 210 that the application 206 can utilize to run, and application code 212. The application 206 thus created is flexible and via exemplary techniques or the exemplary process delegation engine 102 can run 214 solely on a single CPU, such as main CPU 106; or can run 216 solely on one or more auxiliary processors 104; or can run 218 on a combination of the main CPU 106 and at least one of the auxiliary processors 104.

In alternative implementations, the process delegation engine 102 operates on conventional software from a broad class of off-the-shelf and custom software applications, programs, and packages. That is, in some implementations, the process delegation engine 102 can delegate the processes of off-the-shelf software applications among the multiple heterogeneous processors 104 in a computing system 100.

The exemplary application programming model 204 allows the auxiliary processors 104 to run applications under the control of the operating system. The exemplary process delegation engine 102 facilitates running a broad class of applications on peripheral processors and other auxiliary processors 104, thus reducing power consumption and causing less interruption to the applications that may be running on the general purpose or main CPU(s) 106.

Conventionally, vendors do not open processor-containing entities, such as I/O controllers, for application programming. One reason is lack of trust that conventional programs will behave in a memory safe manner. Running third-party applications might corrupt the memory of the vendor's application and cause the device to malfunction. The exemplary process delegation engine 102, however, includes safeguards, such as the type safety verifier 408 and the memory safety verifier 410 that alleviate these problems. In an exemplary system, hardware vendors can allow third-party applications to run on their hardware alongside software that the vendor provides. The hardware vendor can thus guarantee that third-party software will not affect the behavior of the software that is embedded in the hardware system. For instance, with an exemplary process delegation engine 102, the behavior of firmware is not affected by third-party applications.

Even in the face of reliability concerns, some conventional vendors do open their I/O controllers for application programming with a proprietary interface. However, this programmability is rarely used because each application must conventionally be custom-tailored to the I/O controller's specific hardware and the vendor's proprietary interface and thus to a different set of compilers and development tools. In the exemplary application programming environment 202, however, application code 212 need not be tailored for a specific I/O controller or a one-off proprietary operating environment. Instead, application code 212 is written to the same programming model 204 and interface with the OS using a common set of development tools regardless of whether the application will run on a CPU or on an auxiliary processor, such as an I/O controller.

Exemplary Engine

Figure 3:
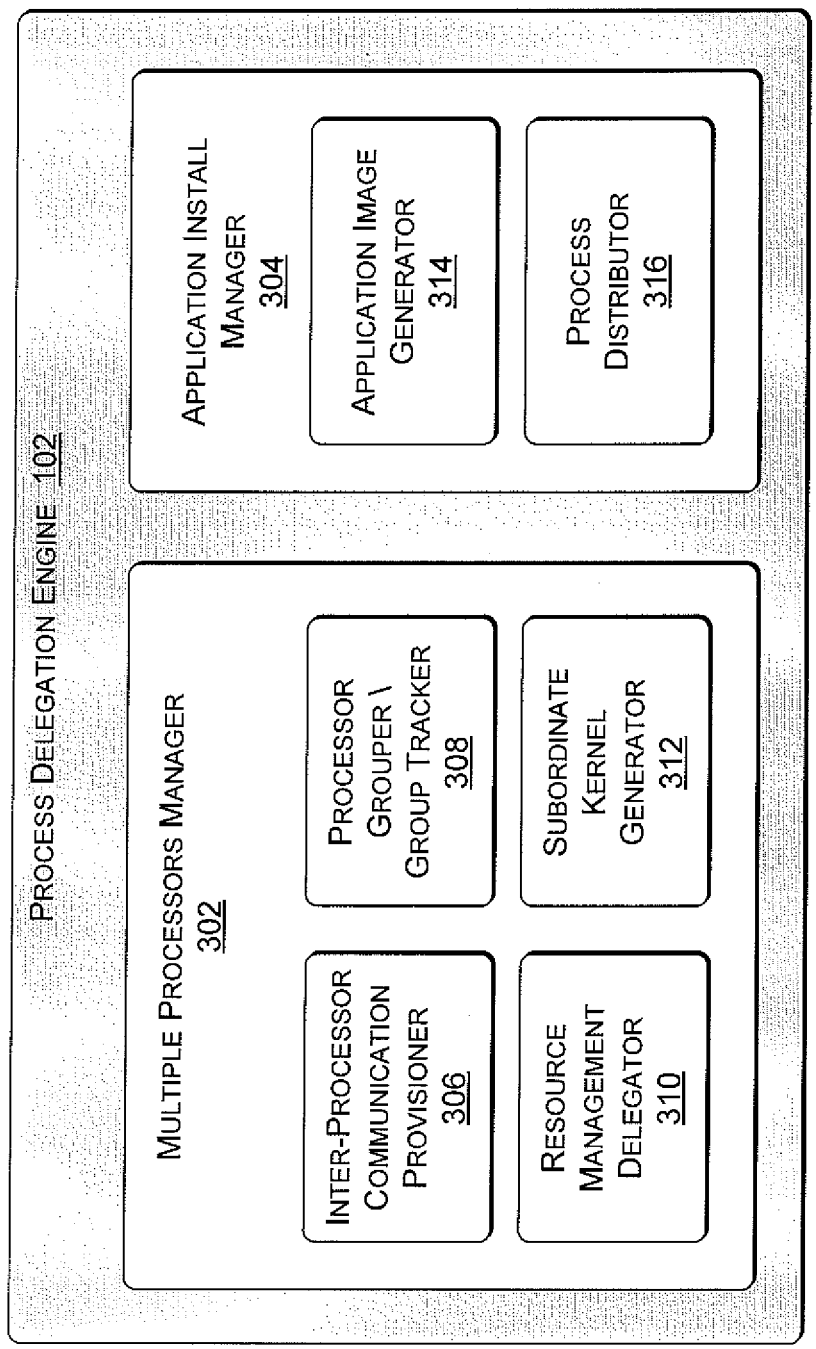
FIG. 3 is block diagram of the exemplary process delegation engine of FIG. 1, in greater detail.

FIG. 3 shows an example version of the process delegation engine 102 of FIG. 1, in greater detail. The illustrated implementation is one example configuration, for descriptive purposes. Many other arrangements of the components of an exemplary process delegation engine 102 are possible within the scope of the subject matter. Such an exemplary process delegation engine 102 can be executed in hardware, software, or combinations of hardware, software, firmware, etc.

Although in one implementation it is named "process delegation engine" 102, the process delegation engine 102 can also be identified by one of its main components, the exemplary multiple processors manager 302. The two identifiers go together. From a functional standpoint, the exemplary process delegation engine 102 manages multiple processors in order to perform process delegation, and to perform process delegation, the process delegation engine 102 manages multiple processors.

In the illustrated example, the process delegation engine 102 includes an application install manager 304, in addition to the multiple processors manager 302. Further, the multiple processors manager 302 may include an inter-processor communication provisioner 306, a processor grouper (or group tracker) 308, a resource management delegator 310, and a subordinate kernel generator 312.

The application install manager 304 may further include an application image generator 314 and a process distributor 316. Subcomponents of the application install manager 304 will now be introduced with respect to FIG. 4.

Figure 4:
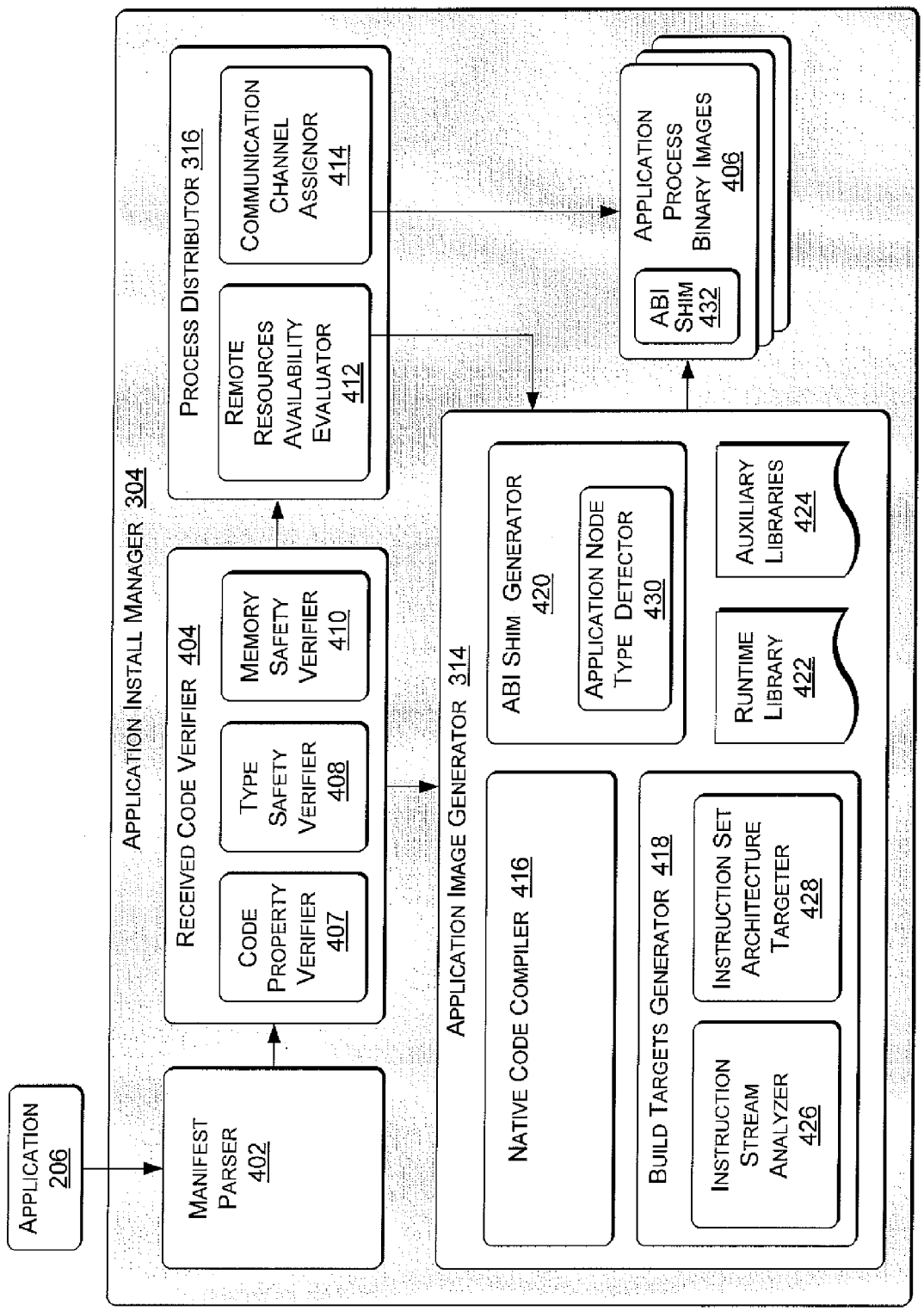
FIG. 4 is a block diagram of an exemplary application install manager of FIG. 3, in greater detail.

FIG. 4 shows the application install manager 304 of FIG. 3, in greater detail. A list of example components is first presented. Then, detailed description of example operation of the process delegation engine 102, including the application install manager 304, will be presented. In one implementation, the illustrated application install manager 304 may use a component or a function of the available OS wherever possible to perform for the components named in the application install manager 304. That is, a given implementation of the application install manager 304 does not always duplicate services already available in a given operating system.

The illustrated application install manager 304 includes a manifest parser 402, a received code verifier 404, the application image generator 314 introduced above, the process distributor 316 introduced above, and application (or "process") binary images 406 generated by the other components.

The received code verifier 404 may include a code property verifier 407, a type safety verifier 408 and a memory safety verifier 410. The process distributor 316 may further include a remote resources availability evaluator 412 and a communication channel assignor 414.

The application image generator 314 may further include a native code compiler 416, a build targets generator 418, an application binary interface (ABI) shim generator 420, a runtime library 422, and auxiliary libraries 424. The build targets generator 418 may further include an instruction stream analyzer 426 and an instruction set architecture targeter 428. The ABI shim generator 420 may further include an application node type detector (or tracker) 430.

Operation of the Exemplary System and Engine

The exemplary process delegation engine 102 aims to address control and communication issues between the general purpose main CPU(s) 106 in a computing system 100 and other auxiliary processors 104 present in the system 100, including processors associated with peripherals.

Figure 5:
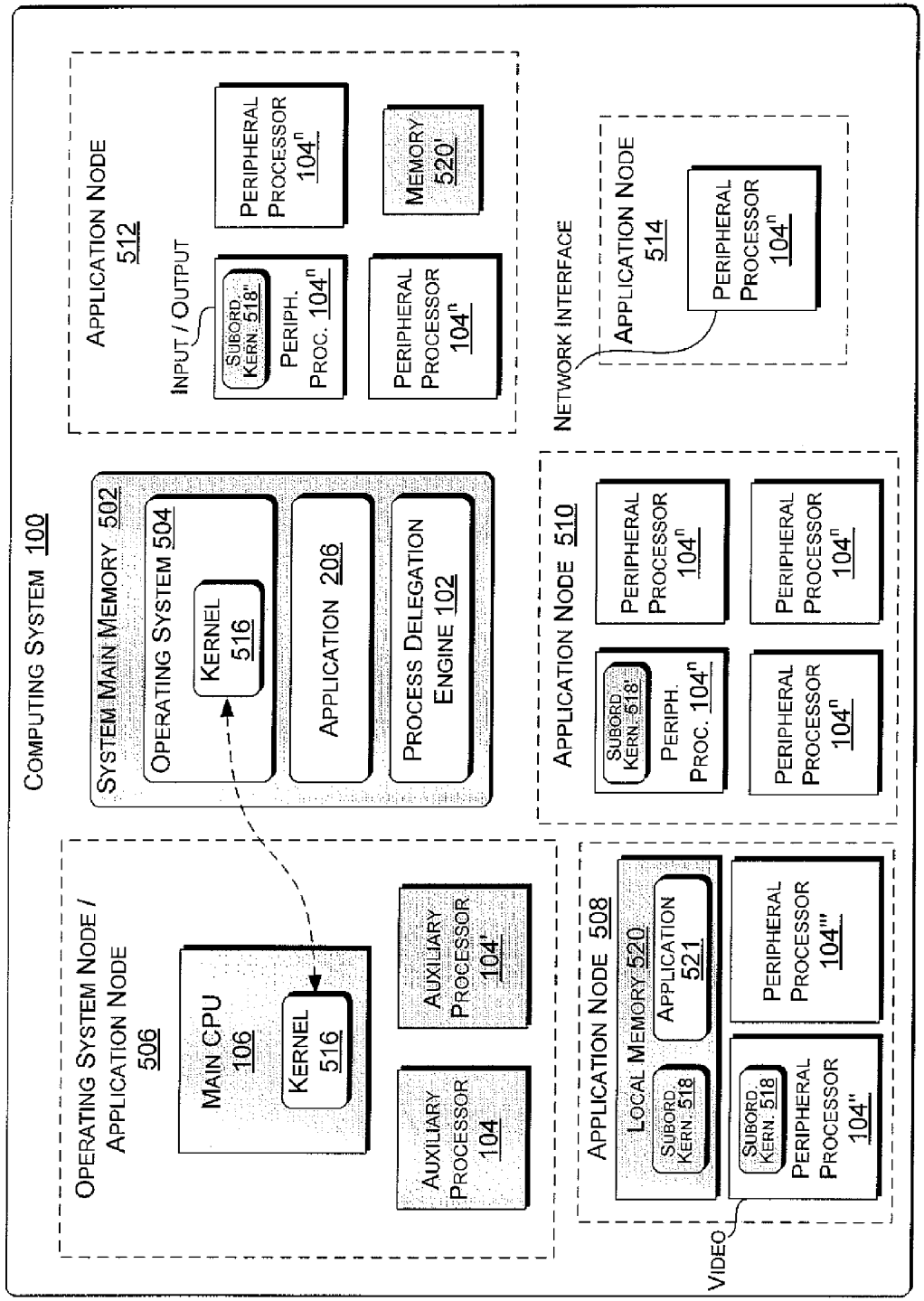
FIG. 5 is a block diagram of the exemplary computing system, showing grouping of processors into nodes with exemplary subordinate kernels.

FIG. 5 shows a computing system 100, including a heterogeneous mix of processors 104 and a main memory 502. The software of the host operating system (OS) 504 resides in memory 502 and runs on a subset of processors-e.g., an operating system node 506, grouped or tracked by the processor grouper 308 (FIG. 3). Applications potentially run on one or more different subset(s) of processors, such as application nodes 508, 510, 512, and 514. This nodal grouping of the processors into the operating system node 506 and the various application nodes affects and enhances the installation of applications, their invocation, and communication with the operating system and other applications.

When the processor grouper 308 partitions the processors into groups or nodes, the operating system node 506 runs the core operating system 504, including the kernel thread or kernel 516. The application nodes run applications, as mentioned above. The terms operating system node 506, application node, and pure application node may be used to describe the processor groups in the system. The operating system node 506 is comprised of the processors running the operating system kernel 516, as mentioned. Application nodes are groups of processors with similar localities that are able to run applications. The operating system node 506 may also be an application node. A pure application node, however, only runs applications. In one implementation, the locality of resources to each processor is flexible, and there is no need to specify the ability of the resources to be protected.

The inter-processor communication provisioner 306 provides the processors in the heterogeneous computing system 100 with a means of sending messages to at least one other processor in the system 100. In one implementation, there is transitive closure in the messaging paths between processors in the system 100. Sending and receiving messages may be realized in many ways, depending on implementation. One mechanism supporting inter-processor messaging utilizes memory regions that are shared between processors, where messages can be written and an interrupt assertion mechanism that allows the sender to alert the recipient of the presence of a message in memory. Another mechanism is a message bus in which messages can be exchanged, but processors share access to no common memory.

The resource management delegator 310 assumes that the operating system node 506 always manages the operating system's own local resources. The operating system 504 manages these system node resources on behalf of the applications that may run on the operating system node 506 itself.

A pure application node, e.g., application node 508, may manage its own local resources, or it may defer the management to the operating system 504. The hardware capabilities of a given application node 508 may constrain the ability of software running on the node 508 to manage its own resources. The extent of local resource management on a pure application node 508 may be determined by the software interface presented by the application node 508, or may be determined from the outset by the software system designer, or may be configured dynamically from within the operating system node 506.

Resource Management Delegation

On a pure application node 508, an exemplary software component referred to herein as a subordinate kernel 518 runs as an agent of the main operating system 504, for example, by residing in a local memory 520 and running on a local processor 104" of the application node 508. The subordinate kernel 518 may manage resources associated with the corresponding application node 508, such as the local memory 520, etc., and may also actively participate in other local resource management activities, such as thread scheduling, and directing and running processes of applications 521 that run mostly or entirely on the application node 508. In one implementation, the exemplary subordinate kernel 518 is only approximately 1/100 of the data size of the main OS kernel 516 and runs in a privileged protection domain on the application node 508. In alternative implementations, the subordinate kernel 518 can be a process running on the application node 508 or compiled into a process on the application node 508.

Figure 6:
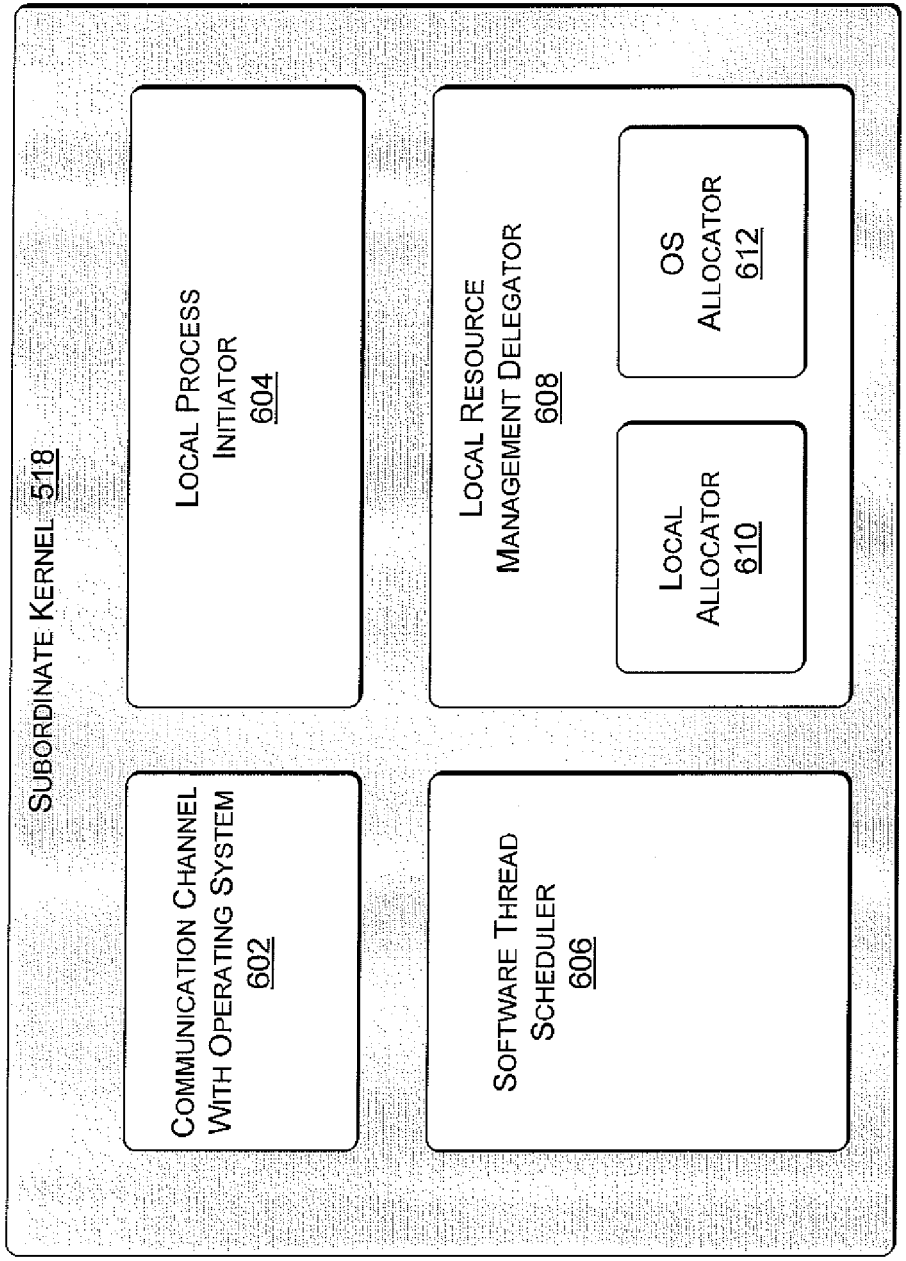
FIG. 6 is a block diagram of the exemplary subordinate kernel of FIG. 5, in greater detail.

FIG. 6 shows one implementation of the exemplary subordinate kernel 518 of FIG. 5, in greater detail. The illustrated subordinate kernel 518 has a communication channel 602 to the operating system 504, a local process initiator 604, a software thread scheduler 606, and a local resource management delegator 608, which may further include a local allocator 610 and an OS allocator 612.

A given subordinate kernel 518 may elect to manage a subset of the local resources associated with its corresponding application node 508, allotting such management via the local allocator 610, and may allow the operating system 504 to manage other resources, allotting these via the OS allocator 612. The subordinate kernel 518 may also notify the operating system 504 of its resource allocations via the communication channel 602 to allow the operating system 504 to make informed management decisions, for instance, to decide which application node to launch a process on. These notifications may be sent at the time of resource allocation change, in an event driven manner, or sent periodically when a time or resource threshold is crossed.

The operating system 504 uses the subordinate kernel 518 to perform operating system services on a pure application node 508 that it could not perform without assistance. For instance, if the operating system node 506 wants to start a process on the application node 508, the operating system 504 sends a message to the subordinate kernel 518 to start the process. The number of different message types that may be exchanged between the operating system 504 and subordinate kernel 518 depends on the capabilities of the subordinate kernel 518, which may very according to implementation. For instance, if the subordinate kernel 518 does not support scheduling its own software threads (lacks the software thread scheduler 606), then the OS-to-subordinate-thread interface can include thread scheduling methods.

Application Installation

Referring back to FIGS. 2-3, in one implementation, an application 206 is delivered to the operating system 504 as a package containing the manifest 208, the list of (e.g., "static") resources used by the application 206, and the application code 212. The manifest 208 describes the resources the application utilizes from the operating system 504; it's dependencies on other components, and the resources the application 206 provides.

In one implementation, the application code 212 is delivered in an architecture independent form, such as MICROSOFT's CIL (common intermediate language) for the .NET platform, or JAVA byte code. The intermediate representation selected should be verifiably type and memory safe. The operating system 504 may invoke one or more tools during installation to verify the properties of the application. The received code verifier 404 (FIG. 4) may check the code through the code property verifier 407, which has verifiers for additional static and runtime properties, and through the type safety verifier 408 and the memory safety verifier 410.

In one implementation, as managed or executed by the application install manager 304 (FIGS. 3-4), the operating system's application installer invokes the native code compiler 416 and the build targets generator 418 (e.g., a build tool chain) to transform the independent representation of the application code 212 into application binaries 406 targeted at the specific instruction set architectures of the processors 104 that the operating system 504 anticipates the application will run on. The build targets may be anticipated from the details presented in the manifest 208 and the properties of the instruction stream.

The application or process binary images 406 are generated from the architecture independent application code 212, the application runtime library 422, additional standard or auxiliary libraries 424 for the application code 212, and a kernel application binary interface (ABI) shim 432 generated by the ABI shim generator 420, which takes into account the type of application node 508. The standard or auxiliary libraries 424 are the libraries of routines that the application 206 typically needs in order to run. The application runtime library 422 provides data-types and functionality essential for the runtime behavior of applications 206, for instance, garbage collection. The ABI shim 432 is not typically part of the application binary 406, but a separate binary loaded into the process along with the application binary 406.

Figure 7:
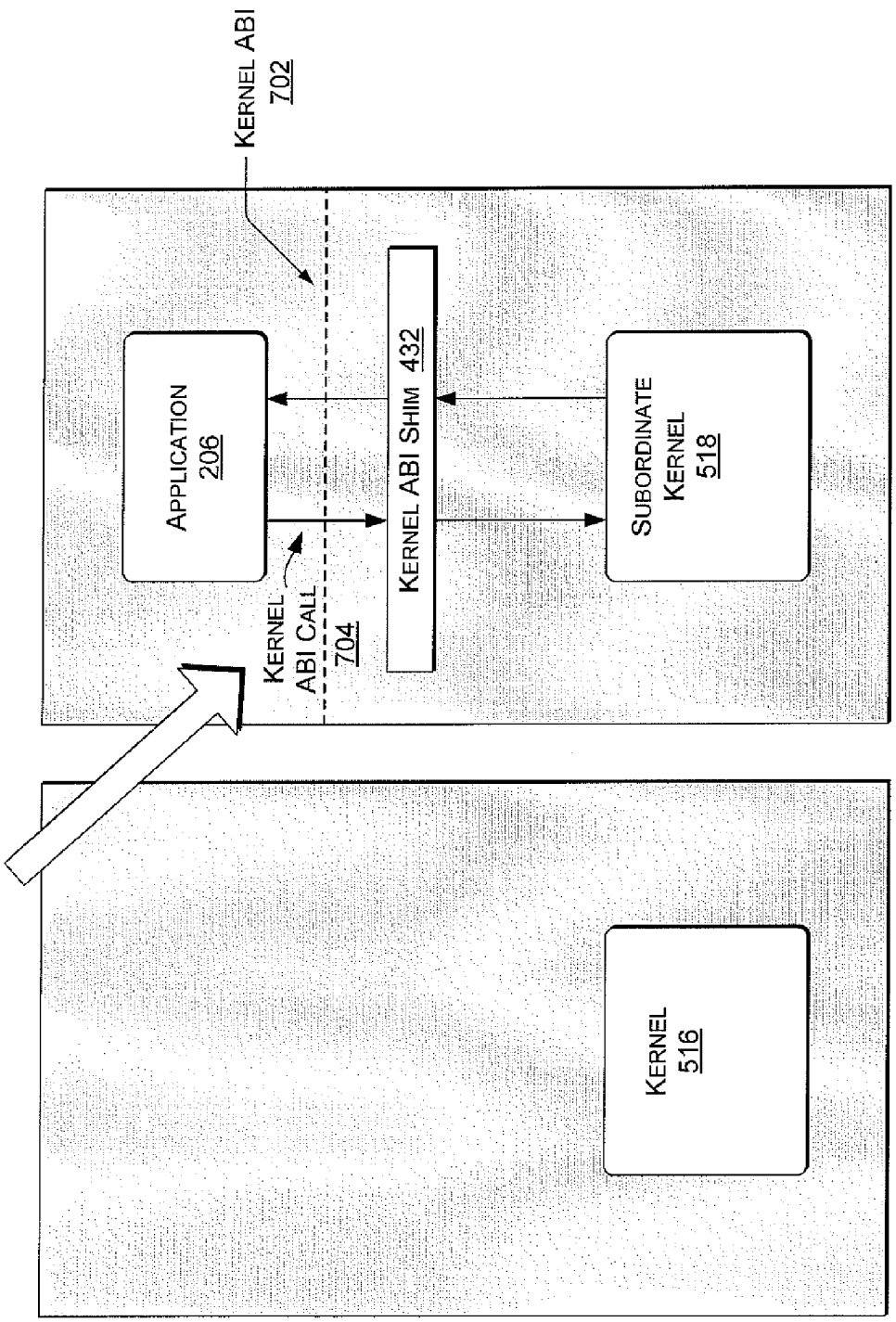
FIG. 7 is a diagram of a call function of an exemplary application binary interface shim to an exemplary subordinate kernel.
Figure 8:
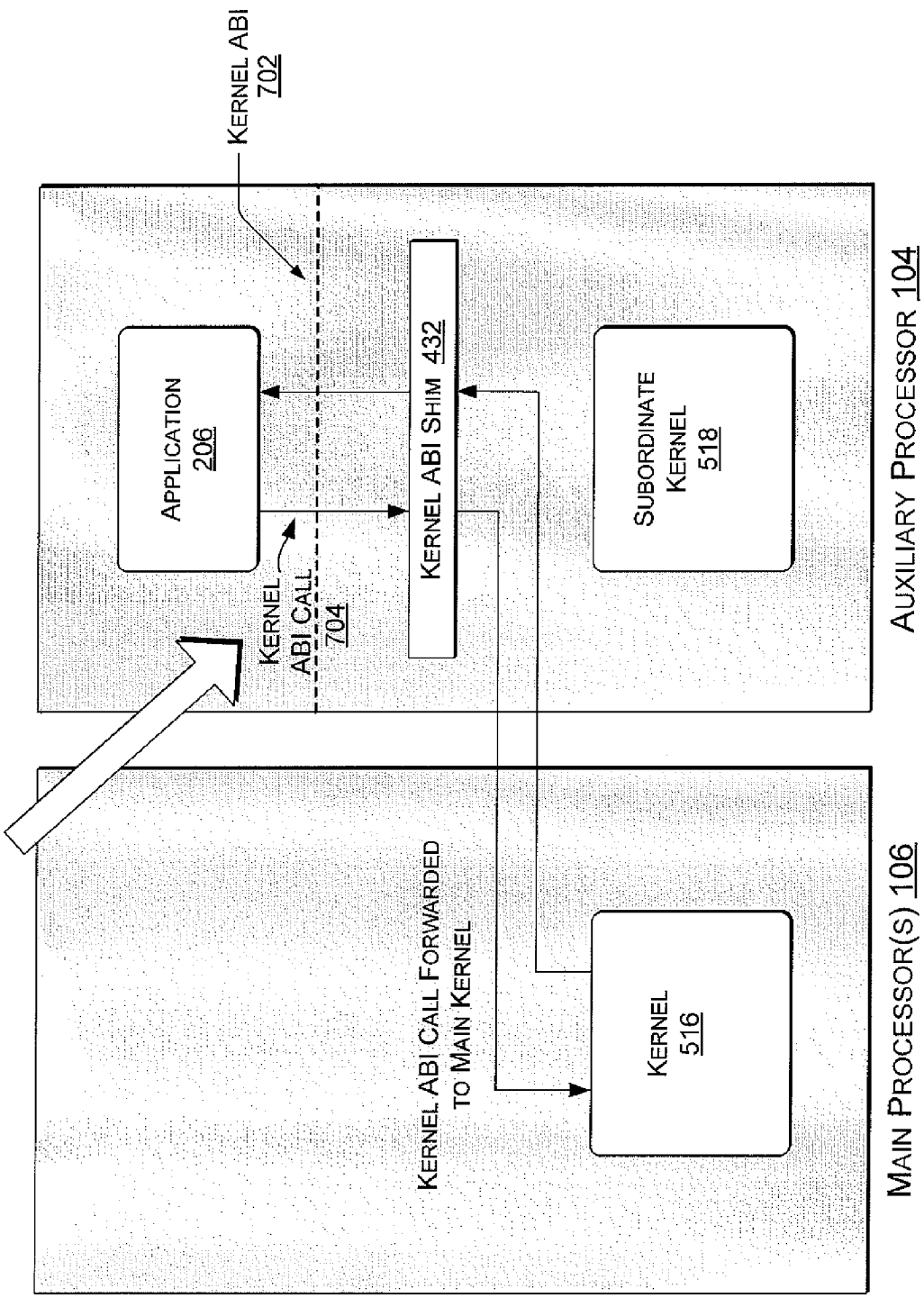
FIG. 8 is a diagram of a call function of an exemplary application binary interface shim to a main OS kernel.

Referring to FIGS. 7-8, the kernel ABI shim 432 exports the corresponding kernel ABI (interface) 702 and is responsible for handling requests to the operating system 504. The application image generator 314 (FIGS. 3-4) creates at least one kernel ABI shim 432 for each type of application node 508 (e.g., pure or OS) that exists in the system 100. First degree processors, such as the main CPU 106 that runs both the OS and applications may receive one build of the ABI shim 432 while second degree processors, such as the auxiliary processors 104, may receive a different build of the ABI shim 432. For example, the install manager 304 may create an ABI shim 432 for each type of I/O processor 104 under management of the process delegation engine 102. For an application 206 running on the operating system node 506, the corresponding ABI shim 432 makes calls to the operating system kernel 516 through the kernel ABI 702.

As shown in FIG. 7, for applications 206 running on a pure application node 508, the ABI shim 432 calls to the local subordinate kernel 518 when the ABI call 704 relates to resources managed by the subordinate kernel 518.

As shown in FIG. 8, the ABI shim 432 performs remote method invocations on the operating system node 506 for ABI calls 704 that cannot be satisfied by the subordinate kernel 518 on the application node 508. For instance, if the subordinate kernel 518 has its own thread scheduler 606 then the ABI shim 432 need not remote the calls relating to scheduling to the operating system node 506; and conversely, if the application node 508 has no scheduling support, then the ABI shim 432 makes remote procedure calls to the operating system node 506 each time a scheduling-related ABI call 704 is made.

Inter-Process Communication

Processes in the exemplary computing system 100 may run on either the operating system node 506 or on an application node 508. Processes use the kernel ABI shim 432 to communicate with the operating system kernel 516 and, as shown in the channel communication mechanism 900 of FIG. 9, processes use a bidirectional typed channel conduit 902 to communicate with other processes, according to a bidirectional channel scheme described in U.S. patent application Ser. No. 11/007,655 to Hunt et al., entitled, "Inter-Process Communications Employing Bi-directional Message Conduits" (incorporated herein by reference, as introduced above under the section, "Related Applications").

In one implementation, the exemplary kernel ABI shim 432 is a library that may be statically compiled into an application image 406 or dynamically loaded when the application 206 starts. In one implementation, the kernel ABI shim 432 and channel communication mechanism 900 are the only two communication mechanisms available to a process: thus, applications 206 are protected from each other by the memory and type safety properties of the process and the restrictions imposed by the kernel ABI 702 design and channel communication mechanism 900.

The kernel ABI shim 432 may call directly into the operating system kernel 516 when a node 506 running the process is also the operating system node 506. When running on a pure application node 508, the kernel ABI shim 432 may use a remote procedure call to invoke the kernel call on the operating system node 506. In systems where the application node 508 has some autonomy over its resource management, the kernel ABI shim 432 directs calls relating to resources it manages to the application node subordinate kernel 518. The kernel ABI shim 432 exports the same methods as the kernel ABI 702. As mentioned above, from the application software developer's perspective there is no difference in the source code based on whether the application will run on the operating system node 506 or on one or more application node 508—the interface of the kernel ABI shim 432 is indistinguishable from the kernel ABI 702.

In exemplary implementations, the kernel ABI 702 contains methods that only affect the state of the calling process-there are no calls in the ABI 702 that a process can use to affect the state of another process, except to terminate a child process. And in one implementation of the kernel ABI 702, the operating system kernel 516 provides no persistent storage of state that two processes could use to exchange information, and thus precludes the use of the ABI 702 to exchange covert information.

Figure 9:
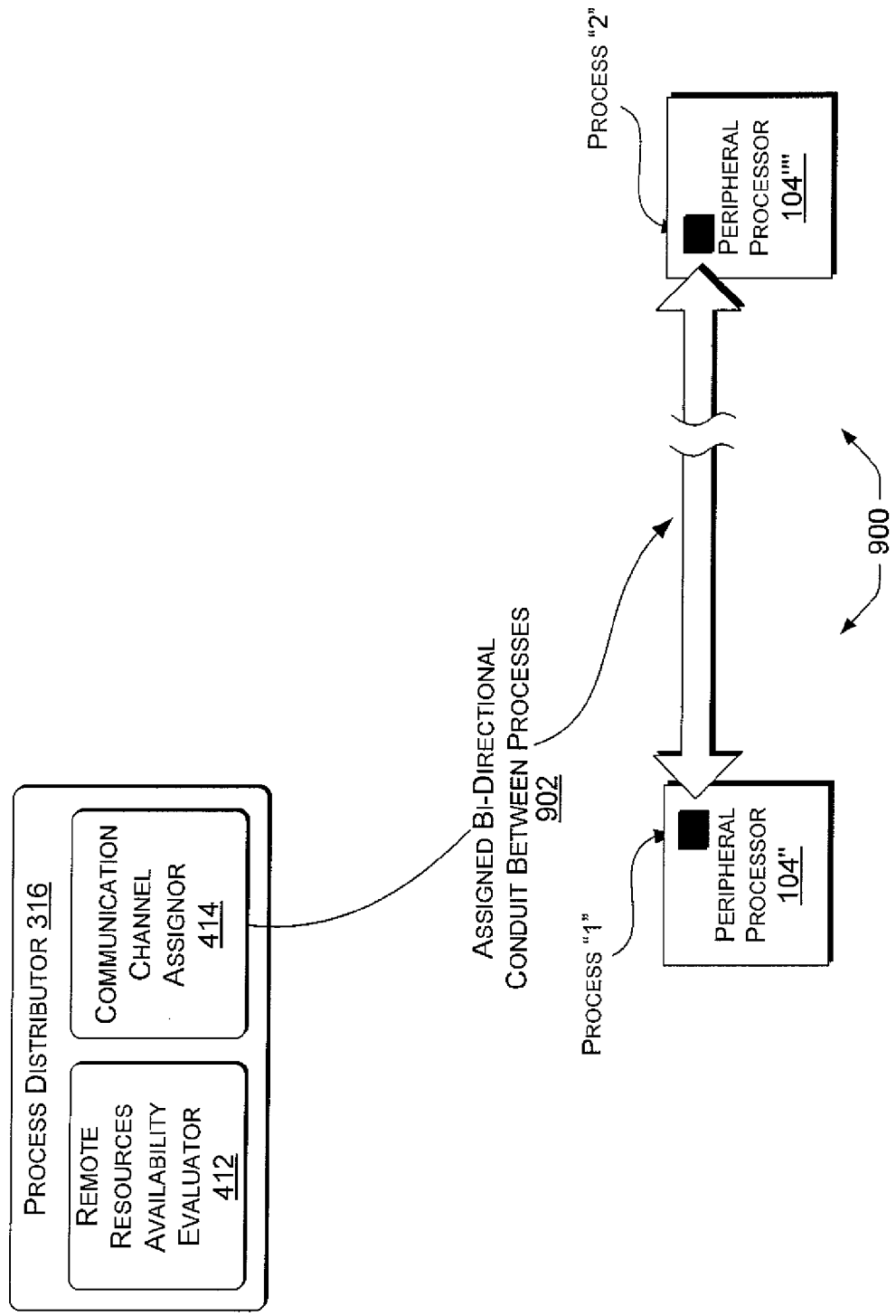
FIG. 9 is a diagram of communication channel assignment between two application processes.

In FIG. 9, messages between processes are exchanged through bi-directional message conduits 902 with exactly two endpoints. The channels 902 provide a lossless first-in-first-out message delivery system. The type and sequence of messages exchanged between two endpoints is declared in a channel contract. When a process starts, the operating system 504 provides the process with an initial set of channel endpoints, e.g., via the communication channel assignor 414. The process being initialized is only able to communicate with processes holding the other endpoints associated with the channel 902.

Messages sent over channels 902 may have associated arguments. In one implementation, message arguments may contain permitted: value types, linear data pointers, and structures composed of value types and linear data pointers. Messages may not contain pointers into the sending process's memory address space. Endpoints may be passed between processes within a channel 902. The type constraint on message arguments maintains the isolation of memory spaces between processes. Thus, there is no way for two processes to exchange data without using channels 902, When an application 206 is running on the operating system node 506, an ABI shim 432 is not necessary as the application 206 may call directly to the operating system kernel 516. When an application running on the operating system node 506 needs to make a channel call, it may use the native implementation of channels used on the system for uniprocessor and symmetric multiprocessor configurations.

When an application 206 running on a pure application node 508 needs to make a channel call or a kernel ABI call 704 to the operating system node 506, a remote method invocation may be used. A remote method invocation is also necessary when any two applications running on different nodes need to communicate with each other over channels 902, and also when the operating system 504 needs to call to a pure application node 508. On a pure application node 508, an ABI call 704 is similar to a channel call, with the difference that an ABI call 704 is directed to only one node, the operating system node 506, whereas the other endpoint of a channel 902 may be located on any node in the system 100.

Figure 10:
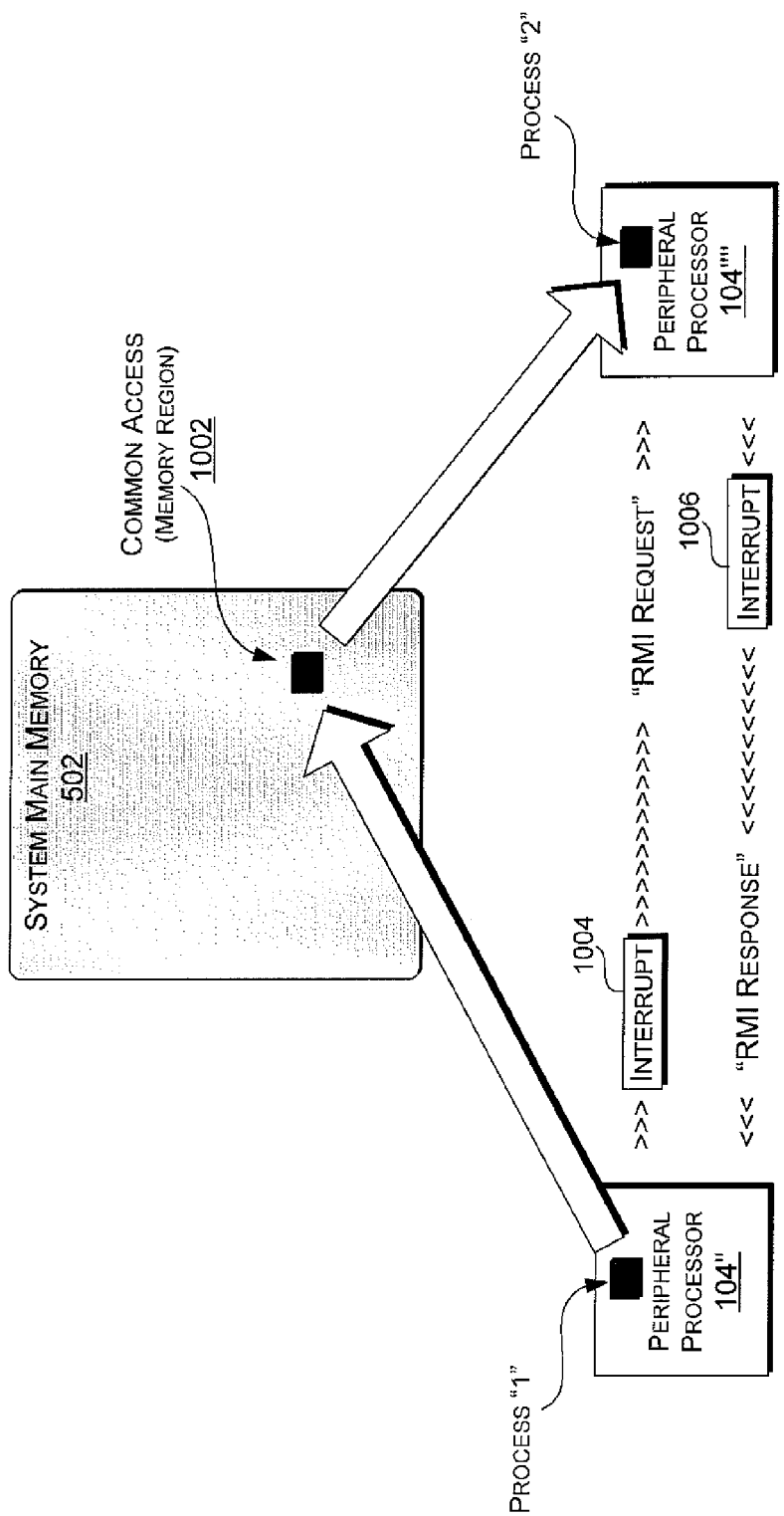
FIG. 10 is a diagram of an exemplary remote method invocation between heterogeneous processors.

The execution of the remote method invocation is realized according to the connectivity between processors 104 in the system. As shown in FIG. 10, in one implementation, realization of remote method invocation uses a memory region 1002 accessible to both caller and callee to hold a message state, and uses inter-processor interrupts 1004 to signal the arrival of a remote method invocation. The callee unmarshals the arguments, executes the request, marshals the response data into another portion of the shared memory region 1002, and then sends an inter-processor interrupt 1006 to signal the arrival of the response.

In one implementation, the caller aims to know or be able to determine the appropriate lower level transport, transport settings, and how to marshal the method and arguments. This information is usually determined through a resolution mechanism. In a typical situation, a pure application node 508 knows at least one well-known node, such as the operating system node 506, and knows the appropriate method of contacting that node 506. The pure application node 508 and its well-known node 506 use a resolver protocol to resolve callee and method. The well-known target(s) help in the resolution of caller and method into an actionable response.

Figure 11:
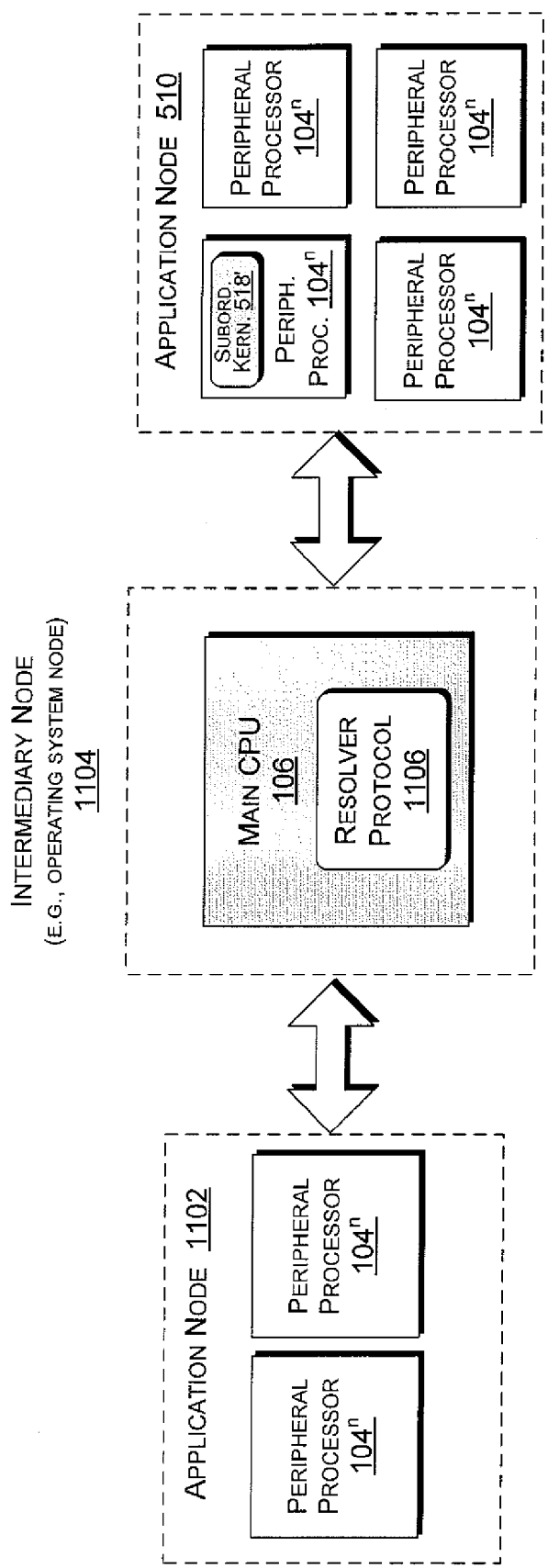
FIG. 11 is a diagram of a processor that is intermediating communication between two heterogeneous processors.

As shown in FIG. 11, in the case that two applications (running on distinct pure application nodes, such as application nodes 510 and 1102) wish to send channel messages to each other, they sometimes may not have a direct conduit for doing so. However, the message may be relayed between the application nodes (510 and 1102) via one or more intermediary nodes 1104, which may also apply the resolver protocol 1106 described above. In one implementation, the operating system node 506 communicates with each application node (510 and 1102), and can act as intermediary between application nodes in the absence of a direct path between them.

Application Processes

In one implementation, the operating system node 506 is responsible for launching processes on the application nodes (e.g., 508) in the system 100. The operating system 504 is aware of each and every installed application 206 and its resource requirements. When a process starts, the operating system 504 decides on a node to launch the application. This decision may be based upon information in the application manifest 208, system configuration state, and/or may be made dynamically based on system resource utilization.

When a process is started on the operating system node 506, the process typically requires no steps in addition those for the conventional launch of a process in a conventional operating system. When a process is to be started on a pure application node 508, the operating system 504 initiates the process. The operating system 504 need only send a message to the local process initiator 604 in the local subordinate kernel 518 on the node 508, informing the node 508 where to locate the process image 406 and corresponding resources. The subordinate kernel 518 then becomes responsible for starting the process and notifies the operating system kernel 516 of the outcome of the process initialization process. In one implementation, the subordinate kernel 518 itself is also started during the initialization of the application node 508. The subordinate kernel 518 instruction stream may be present in non-volatile storage associated with the node 508 or it may be loaded into the memory associated with the application node 508 by the operating system node 506 when the operating system node 506 initializes the application node 508.

Exemplary Methods

Figure 12:
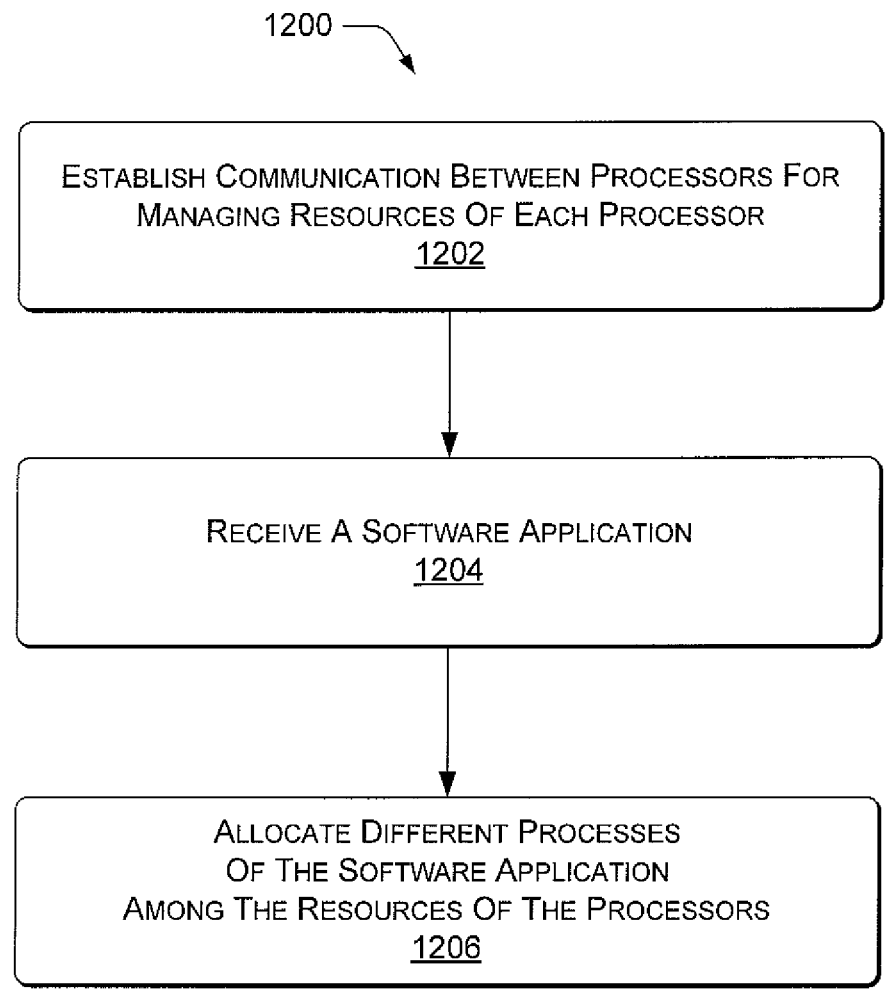
FIG. 12 is a flow diagram of an exemplary method of running an application on multiple heterogeneous processors.

FIG. 12 shows an exemplary method 1200 of running an application on multiple heterogeneous processors. In the flow diagram, the operations are summarized in individual blocks. The exemplary method 1200 may be performed by hardware, software, or combinations of hardware, software, firmware, etc., for example, by components of the exemplary process delegation engine 102.

At block 1202, communication is established between the processors for managing resources associated with each processor. Conventionally, two processors in a computing system may or may not communicate with each other. For example, two far-flung processors on peripheral plug-in cards may not communicate directly with each other at all. But exemplary communication between all relevant processors in computing system can be achieved in a practical sense—for purposes of deciding management of computing resources. Some processors can communicate with each other by leaving messages in a memory region and then using processor interrupts to signal the other processor of the message's presence. Subordinate "pared-down" kernels of the operating system can be associated with groups of auxiliary and peripheral processors to communicate with the main OS kernel and manage local resources. Communication is thus set up between multiple heterogeneous processors in a computing system so that the operating system can discern what computing resources are available across the heterogeneous processors and whether the OS itself is managing a given resource or whether an assigned subordinate kernel is instead managing the given resource on a more local level.

At block 1204, a software application is received. In one implementation, the software application is designed with a manifest and a list of likely resource needs so that the operating system can efficiently allocate processes of the application among the multiple heterogeneous processors However, in another implementation, a stock or off-the-shelf application is received that is agnostic to the method 1400 of running an application on multiple heterogeneous processors.

At block 1206, different processes of the software application are allocated among the resources of the processors. In one implementation, the application is transformed into neutral or generic binary images that can be run on one processor or many—given the communication established between heterogeneous processors and their heterogeneous resources.

Figure 13:
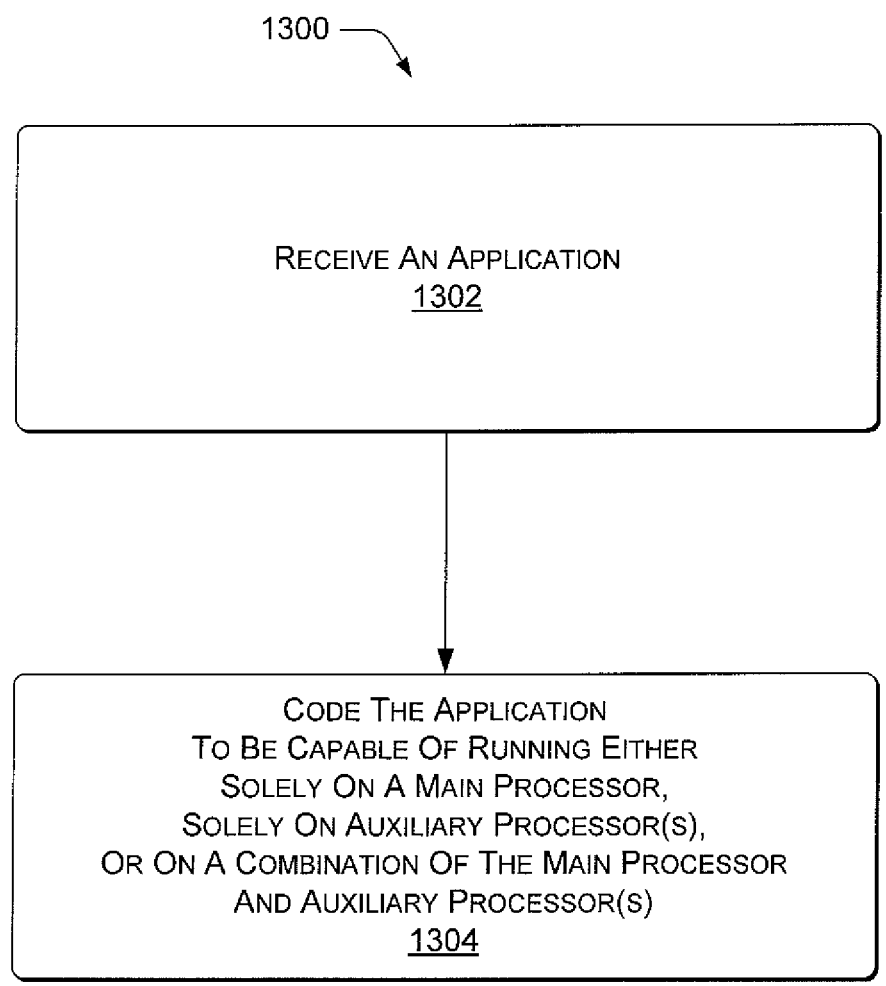
FIG. 13 is a flow diagram of an exemplary method of creating an application that is capable of running on multiple heterogeneous processors.

FIG. 13 shows an exemplary method 1300 of creating an application capable of running on multiple heterogeneous processors. In the flow diagram, the operations are summarized in individual blocks. The exemplary method 1300 may be performed by hardware, software, or combinations of hardware, software, firmware, etc., for example, by components of the exemplary process delegation engine 102.

At block 1302, an application is received. The application may be designed with an exemplary manifest and list of likely needed resources, or the application may be received as-is, off-the-shelf in conventional form, as described above in the previous method 1200.

At block 1304, the application is coded so that the application is capable of running either solely on a main processor, solely on one or more auxiliary processors, or on a combination of the main processor and one or more auxiliary processors. The application can exist in an architecture independent form, and be further transformed into a neutral or generic code so that the application will run on one or many processors. The intermediate representation is preferably type and memory safe. The operating system may verify the properties of the application.

In one implementation, the operating system's application installer invokes a native code compiler and a build tool chain to transform the application code into application binaries targeted at the specific instruction set architectures of the processors that the operating system anticipates the application will run on. The build targets may be anticipated from the details presented in a manifest and/or properties of the instruction stream.

In one implementation, the application or process binary images are generated from architecture independent application code, and from a runtime library and additional standard or auxiliary libraries. Coding the application into binaries may include creating a kernel application binary interface (ABI) shim—usually a separate binary—that takes into account the type of application node target that will run the application binary image.

Figure 14:
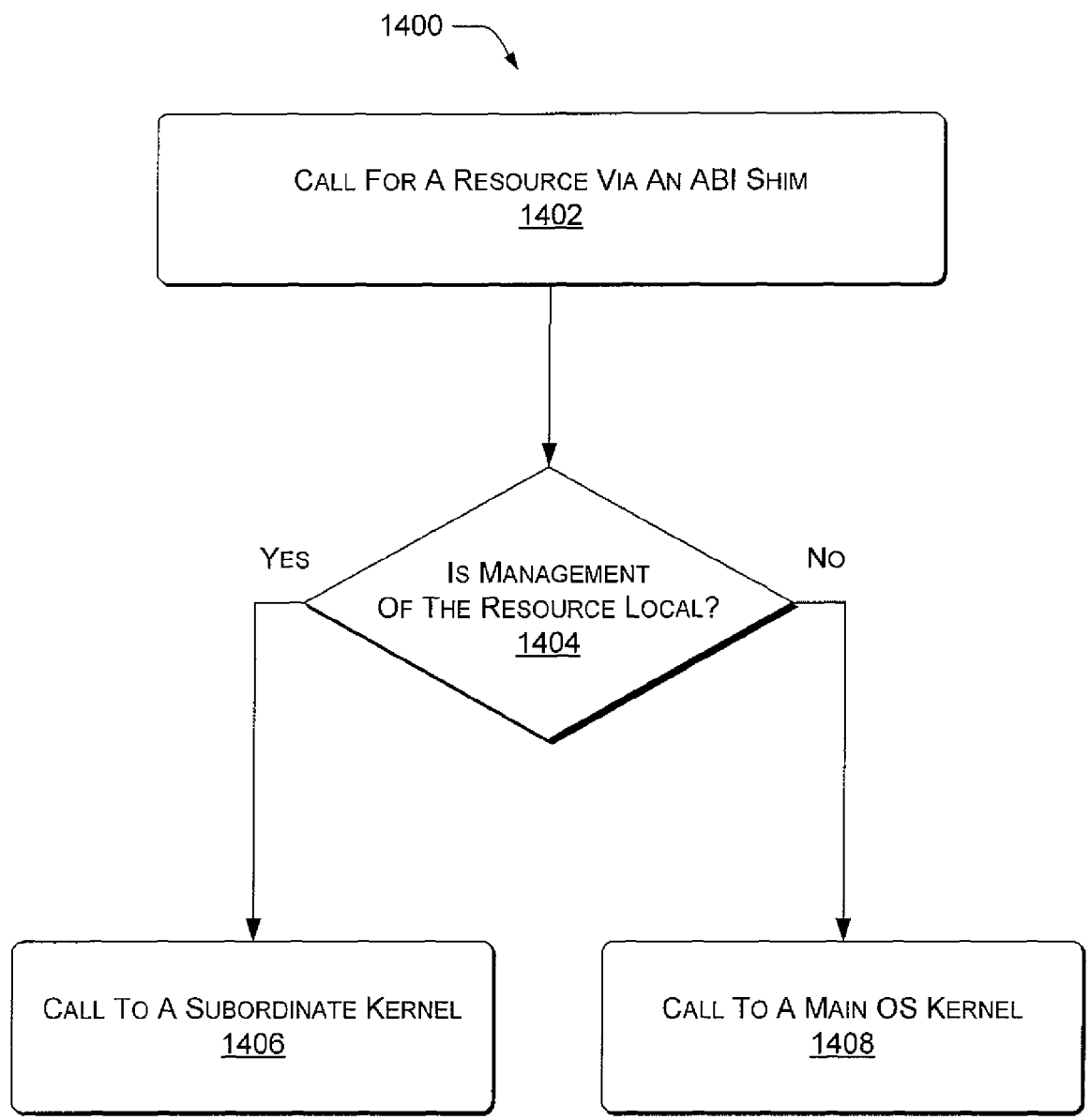
FIG. 14 is a flow diagram of an exemplary method of directing application binary interface (ABI) calls from an application process running on an application processor.

FIG. 14 shows an exemplary method 1400 of directing application binary interface (ABI) calls to enable an application to run on multiple heterogeneous processors. In the flow diagram, the operations are summarized in individual blocks. The exemplary method 1400 may be performed by hardware, software, or combinations of hardware, software, firmware, etc., for example, by components of the exemplary process delegation engine 102.

At block 1402, an ABI shim makes an ABI call for a resource. That is, a process of an application running, e.g., on a pure application processing processor, or group of processors calls for a resource via the kernel ABI. The ABI shim, compiled into the application binary that is running, can direct its call depending on which kernel manifestation is managing the resource being requested, At block 1404, locality of the resource's managing entity is tested. The ability to detect which kernel manifestation—main OS kernel or an exemplary subordinate kernel—is controlling a given resource can be fixed into the ABI shim during its creation, if management of certain resources is static and known at the time of ABI shim generation. Or, a particular ABI shim may include routines to detect dynamically-changing management of a given resource.

At block 1406, the ABI shim calls to a local subordinate kernel when the ABI call relates to resources managed by the subordinate kernel. That is, the ABI shim calls locally to the local subordinate kernel rather than call the main OS kernel, if management has been assigned to the local kernel. To the calling application process, the ABI shim is transparent. No matter where the ABI shim calls, the ABI shim presents the same kernel ABI appearance to the running application process.

At block 1408, the ABI shim performs remote method invocations on the operating system's main kernel for ABI calls that cannot be satisfied by the subordinate kernel. That is, if a called resource is not under control of the local node of application-processing processors, then the ABI shim invokes the main OS kernel, which is typically managing the called resource if the local subordinate kernel is not.

Exemplary Computing Device

FIG. 15 shows an exemplary computing system 100 suitable as an environment for practicing aspects of the subject matter, for example to host an exemplary process delegation engine 102. The components of computing system 100 may include, but are not limited to, a processing unit 106, a system memory 502, and a system bus 1521 that couples various system components including the system memory 502 and the processing unit 106. The system bus 1521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing system 100 typically includes a variety of computing device-readable media. Computing device-readable media can be any available media that can be accessed by computing system 100 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 100. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 502 includes or is associated with computing device storage media in the form of volatile and/or nonvolatile memory such as read only memory (ROM) 1531 and random access memory (RAM). A basic input/output system 1533 (BIOS), containing the basic routines that help to transfer information between elements within computing system 100, such as during start-up, is typically stored in ROM 1531. RAM system memory 502 typically contains data and/or program modules that are immediately accessible to and/or presently being operated on by processing unit 106. By way of example, and not limitation, FIG. 15 illustrates operating system 504, application programs 206, other program modules 1536, and program data 1537. Although the exemplary process delegation engine 102 is depicted as software in random access memory 502, other implementations of an exemplary process delegation engine 102 can be hardware or combinations of software and hardware.

The exemplary computing system 100 may also include other removable/non-removable, volatile/nonvolatile computing device storage media. By way of example only, FIG. 15 illustrates a hard disk drive 1541 that reads from or writes to non-removable, nonvolatile magnetic media, a magnetic disk drive 1551 that reads from or writes to a removable, nonvolatile magnetic disk 1552, and an optical disk drive 1555 that reads from or writes to a removable, nonvolatile optical disk 1556 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 1541 is typically connected to the system bus 1521 through a non-removable memory interface such as interface 1540, and magnetic disk drive 1551 and optical disk drive 1555 are typically connected to the system bus 1521 by a removable memory interface such as interface 1550.

The drives and their associated computing device storage media discussed above and illustrated in FIG. 15 provide storage of computing device-readable instructions, data structures, program modules, and other data for computing system 100. In FIG. 15, for example, hard disk drive 1541 is illustrated as storing operating system 1544, application programs 1545, other program modules 1546, and program data 1547. Note that these components can either be the same as or different from operating system 504, application programs 206, other program modules 1536, and program data 1537. Operating system 1544, application programs 1545, other program modules 1546, and program data 1547 are given different numbers here to illustrate that, at a minimum, they are different copies. A user may enter commands and information into the exemplary computing system 100 through input devices such as a keyboard 1548 and pointing device 1561, commonly referred to as a mouse, trackball, or touch pad. Other input devices (not shown) may include a microphone, joystick, game pad, satellite dish, scanner, or the like. These and other input devices are often connected to the processing unit 106 through a user input interface 1560 that is coupled to the system bus, but may be connected by other interface and bus structures, such as a parallel port, game port, or a universal serial bus (USB). A monitor 1562 or other type of display device is also connected to the system bus 1521 via an interface, such as a video interface 1590. In addition to the monitor 1562, computing devices may also include other peripheral output devices such as speakers 1597 and printer 1596, which may be connected through an output peripheral interface 1595.

The exemplary computing system 100 may operate in a networked environment using logical connections to one or more remote computing devices, such as a remote computing device 1580. The remote computing device 1580 may be a personal computing device, a server, a router, a network PC, a peer device or other common network node, and typically includes many or all of the elements described above relative to computing system 100, although only a memory storage device 1581 has been illustrated in FIG. 15. The logical connections depicted in FIG. 15 include a local area network (LAN) 1571 and a wide area network (WAN) 1573, but may also include other networks. Such networking environments are commonplace in offices, enterprise-wide computing device networks, intranets, and the Internet.

When used in a LAN networking environment the exemplary computing system 100 is connected to the LAN 1571 through a network interface or adapter 1570. When used in a WAN networking environment, the exemplary computing system 100 typically includes a modem 1572 or other means for establishing communications over the WAN 1573, such as the Internet. The modem 1572, which may be internal or external, may be connected to the system bus 1521 via the user input interface 1560, or other appropriate mechanism. In a networked environment, program modules depicted relative to the exemplary computing system 100, or portions thereof, may be stored in the remote memory storage device. By way of example, and not limitation, FIG. 15 illustrates remote application programs 1585 as residing on memory device 1581. It will be appreciated that the network connections shown are exemplary and other means of establishing a communications link between the computing devices may be used.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-executable method for a computing system that includes an operating system and multiple heterogeneous processors, comprising:
    establishing communication between the multiple heterogeneous processors for managing resources associated with the multiple heterogeneous processors, the multiple heterogeneous processors including a first subset of processors executing an operating system and an operating system kernel, and a second subset of processors executing a subordinate kernel agent;
    allocating, by the subordinate kernel agent executing on the second subset of the multiple heterogeneous processors, a plurality of processes of a software application among resources of the second subset of the multiple heterogeneous processors; and
    directing, by an application binary interface (ABI) shim executing on the second subset of the multiple heterogeneous processors, a call from the software application for one of the resources to the subordinate kernel based on a determination by the ABI shim that the subordinate kernel manages the one of the resources.

2. The computer-executable method as recited in claim 1, wherein the software application comprises one of a generic software program, a commercial software program, a custom software program, a retail software program, and an off-the-shelf software program.

3. The computer-executable method as recited in claim 1, wherein the multiple heterogeneous processors include a main processor and one or more auxiliary processors;
    wherein the operating system and an operating system kernel execute on the first subset of the multiple heterogeneous processors, the first subset including the main processor; and
    wherein the method further comprises determining, by the application binary interface (ABI) shim, to direct another call from the software application for another one of the resources to the operating system kernel based on a determination by the ABI shim that the operating system kernel manages the other one of the resources.

4. The computer-executable method as recited in claim 3, wherein the first and second subsets overlap.

5. The computer-executable method as recited in claim 3, wherein the second subset of processors runs the software application processes under management of the operating system.

6. The computer-executable method as recited in claim 3, wherein the one or more auxiliary processors include two or more of programmable graphics processing units (GPUs), network controllers, general purpose central processing units (CPUs), micro controllers, disk controllers, redundant array of independent disks (RAID) controllers, sound processors, and numerical co-processors.

7. The computer-executable method as recited in claim 3, wherein the software application is formulated according to a programming model configured to enable the software application to run on the main processor, on the one or more auxiliary processors, or on a combination of the main processor and the one or more auxiliary processors.

8. The computer-executable method as recited in claim 3, further comprising converting the software application into instructions that are compatible with an instruction set associated with the main processor and another instruction set associated with the one or more auxiliary processors.

9. The computer-executable method as recited in claim 3, further comprising:
    managing, by the first subset of the multiple heterogeneous processors local resources associated with the first subset of the multiple heterogeneous processors; and
    deferring, by the second subset of the multiple heterogeneous processors, management of at least some of the corresponding local resources associated with the second subset of the multiple heterogeneous processors to the operating system.

10. The computer-executable method as recited in claim 3, wherein the subordinate kernel agent includes a software agent of the operating system, and wherein the subordinate kernel agent is configured to manage computing resources associated with the second subset of the multiple heterogeneous processors and to perform thread scheduling on behalf of the second subset of the multiple heterogeneous processors.

11. The computer-executable method as recited in claim 10, further comprising:
    communicating, by the subordinate kernel agent an inventory of local resources of the second subset of the multiple heterogeneous processors to the operating system to enable the operating system to determine whether to launch the different processes of the software application on the second subset of the multiple heterogeneous processors.

12. The computer-executable method as recited in claim 10, further comprising utilizing, by the operating system, the subordinate kernel agent to perform an operating system service on the second subset of processors.

13. The computer-executable method as recited in claim 1, further comprising:
    ones of the multiple heterogeneous processors communicating with each other via regions of a memory of the computing system; and
    the ones of the multiple heterogeneous processors signaling remote method invocation via inter-processor interrupts.

14. The computer-executable method as recited in claim 1, further comprising ones of the multiple heterogeneous processors communicating with each other via a message transport.

15. The computer-executable method as recited in claim 10, further comprising selecting, by the operating system, the second subset of the multiple heterogeneous processors to launch the different processes of the software application on based on one or more of characteristics of the software application, a system configuration state, and a system resource utilization.

16. The computer-executable method as recited in claim 15, further comprising sending, by the operating system, a message to the subordinate kernel agent indicating a location of a process image and associated local resources; and
    initiating, by the subordinate kernel agent, a process corresponding to the process image and notifying the operating system of an outcome of the initiating the process.

17. A computing system, comprising:
    multiple heterogeneous processors;
    an operating system executable by a first subset of the multiple heterogeneous processors;

a multiple-processor manager configured to establish communication between the multiple heterogeneous processors for managing computing resources among the multiple heterogeneous processors, wherein the operating system is configured to allocate processes of a software application among different ones of the multiple heterogeneous processors;

a subordinate kernel agent of the operating system, executable by a second subset of the multiple heterogeneous processors, and configured to initiate a process of the software application on the second subset of the multiple heterogeneous processors upon reception of an instruction from the operating system; and an application binary interface shim (ABI) including an application binary executable by the second subset of the multiple heterogeneous processors, the ABI shim configured to determine a locality of a particular resource's management, the ABI shim further configured to direct a call to one of a kernel of the operating system and the subordinate kernel agent based on the determined locality.

18. The computing system as recited in claim 17, wherein:

the locality of a particular resource's management is based in part on the presence of a thread scheduler In the subordinate kernel agent;

the subordinate kernel agent is further configured to manage computing resources associated with the second subset of the multiple heterogeneous processors in the computing system using the thread scheduler; and the subordinate kernel agent is configured to perform a subset of operating system services on behalf of the operating system.

19. A computer-executable method, comprising:

enabling communication between an operating system and a plurality of heterogeneous processors, the plurality of heterogeneous processors configured to perform operating system services for processes of a software application;

assigning the processes of the software application among the plurality of heterogeneous processors; and loading an application binary interface (ABI) shim on a subset of the plurality of heterogeneous processors, the ABI shim configured to determine a locality of a resource's managing entity, and to direct, based on the determined locality, a call relating to the resource to one of a subordinate kernel agent executing on the subset of the plurality of heterogeneous processors and an operating system kernel executing on another subset of the plurality of heterogeneous processors.

20. The computer-executable method of claim 19, further comprising initiating, by the subordinate kernel agent of the operating system, a process of the software application on the subset of the multiple heterogeneous processors upon reception of instruction from the operating system.

* * * * *